(12) United States Patent
Lau et al.

(10) Patent No.: US 9,111,538 B2
(45) Date of Patent: Aug. 18, 2015

(54) GENIUS BUTTON SECONDARY COMMANDS

(75) Inventors: Kevin Lau, Issaquah, WA (US);
Desmond Smith, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 478 days.

(21) Appl. No.: 13/114,923

(22) Filed: May 24, 2011

(65) Prior Publication Data

US 2011/0223893 A1    Sep. 15, 2011

Related U.S. Application Data

(63) Continuation-in-part of application No. 12/570,945, filed on Sep. 30, 2009.

(60) Provisional application No. 61/348,183, filed on May 25, 2010.

(51) Int. Cl.
| | |
|---|---|
| H04M 1/725 | (2006.01) |
| G10L 15/26 | (2006.01) |
| G10L 15/22 | (2006.01) |
| H04M 1/27 | (2006.01) |

(52) U.S. Cl.
CPC ............... G10L 15/265 (2013.01); G10L 15/22 (2013.01); H04M 1/72552 (2013.01); H04M 1/271 (2013.01); H04M 1/72522 (2013.01); H04M 2250/74 (2013.01)

(58) Field of Classification Search
CPC ............ H04M 1/271; H04M 1/72519; H04M 1/6041; H04M 2250/74; H04M 3/42042; H04M 1/575; H04M 2207/18; H04M 1/7522; H04M 1/7253; H04M 1/72522; G10L 15/265; H04W 4/12; H04L 12/5895

USPC .......... 455/563, 415, 414.4, 567, 41.2, 412.2
See application file for complete search history.

(56) References Cited

U.S. PATENT DOCUMENTS

| | | |
|---|---|---|
| 4,945,570 A | 7/1990 | Gerson et al. |
| 5,337,346 A | 8/1994 | Uchikura |

(Continued)

FOREIGN PATENT DOCUMENTS

| | | |
|---|---|---|
| EP | 1147649 A1 | 10/2001 |
| EP | 1211873 A2 | 6/2002 |

(Continued)

OTHER PUBLICATIONS

PCT Search Report and Written Opinion mailed Jun. 8, 2011 for PCT Application No. PCT/US10/50270.

(Continued)

*Primary Examiner* — Lisa Hashem
(74) *Attorney, Agent, or Firm* — Lee & Hayes, PLLC

(57) ABSTRACT

Methods, systems and articles for receiving, by a telecommunication device, audio input through a unified audio interface are disclosed herein. The telecommunication device is further configured to perform at least one of a dictation action, an incoming message processing action, a navigation action, a content lookup action, or a contact lookup action while continuously or substantially continuously receiving voice commands from a user. In some aspects, the telecommunications device may continuously receive and process voice command while operating in a driving mode, which may be initiated by the telecommunications device.

20 Claims, 12 Drawing Sheets

(56) References Cited

U.S. PATENT DOCUMENTS

| | | | |
|---|---|---|---|
| 5,864,603 A | 1/1999 | Haavisto et al. | |
| 5,872,837 A | 2/1999 | Johnson | |
| 6,208,972 B1 | 3/2001 | Grant et al. | |
| 6,212,408 B1 | 4/2001 | Son et al. | |
| 6,584,179 B1* | 6/2003 | Fortier et al. | 379/88.01 |
| 6,606,599 B2 | 8/2003 | Grant et al. | |
| 6,718,307 B1 | 4/2004 | Buil et al. | |
| 6,721,705 B2 | 4/2004 | Kurganov et al. | |
| 6,804,330 B1* | 10/2004 | Jones et al. | 379/88.01 |
| 6,895,257 B2* | 5/2005 | Boman et al. | 455/556.1 |
| 7,689,253 B2* | 3/2010 | Basir | 455/563 |
| 7,801,283 B2 | 9/2010 | Harwood et al. | |
| 7,899,673 B2 | 3/2011 | Brown | |
| 2002/0191757 A1* | 12/2002 | Belrose | 379/88.13 |
| 2003/0032415 A1* | 2/2003 | Cho et al. | 455/415 |
| 2003/0092453 A1 | 5/2003 | Mills et al. | |
| 2003/0109290 A1* | 6/2003 | Moffi et al. | 455/569 |
| 2004/0001588 A1 | 1/2004 | Hairston | |
| 2004/0219906 A1* | 11/2004 | Benco et al. | 455/415 |
| 2004/0230636 A1 | 11/2004 | Masuoka et al. | |
| 2005/0239481 A1 | 10/2005 | Seligmann | |
| 2006/0075407 A1 | 4/2006 | Powers et al. | |
| 2006/0142067 A1* | 6/2006 | Adler | 455/563 |
| 2007/0136677 A1 | 6/2007 | Agarwal | |
| 2007/0286398 A1 | 12/2007 | Ramamoorthy et al. | |
| 2008/0015863 A1 | 1/2008 | Agapi et al. | |
| 2008/0046250 A1 | 2/2008 | Agapi et al. | |
| 2008/0059195 A1 | 3/2008 | Brown | |
| 2008/0254746 A1 | 10/2008 | Krishnan et al. | |
| 2009/0019396 A1 | 1/2009 | McCarthy | |
| 2009/0253463 A1* | 10/2009 | Shin et al. | 455/563 |
| 2010/0009719 A1* | 1/2010 | Oh et al. | 455/563 |
| 2010/0216509 A1* | 8/2010 | Riemer et al. | 455/557 |
| 2011/0092187 A1 | 4/2011 | Miller | |
| 2011/0201385 A1* | 8/2011 | Higginbotham | 455/563 |
| 2012/0022872 A1* | 1/2012 | Gruber et al. | 704/270.1 |
| 2012/0252421 A1* | 10/2012 | Abdel-Kader | 455/415 |
| 2013/0165165 A1* | 6/2013 | Macek et al. | 455/466 |
| 2013/0243176 A1* | 9/2013 | Martino et al. | 379/207.02 |
| 2013/0275899 A1* | 10/2013 | Schubert et al. | 715/765 |
| 2014/0185784 A1* | 7/2014 | Moss et al. | 379/142.04 |
| 2014/0222427 A1* | 8/2014 | Moore | 704/246 |
| 2014/0256298 A1* | 9/2014 | Moss et al. | 455/414.1 |
| 2015/0081309 A1* | 3/2015 | Gazdzinski | 704/275 |

FOREIGN PATENT DOCUMENTS

| | | |
|---|---|---|
| EP | 1333650 | 8/2003 |
| KR | 20030009022 | 1/2003 |
| KR | 10-2005-0122720 A | 12/2005 |
| KR | 10-2006-0089493 A | 8/2006 |
| KR | 10-0646732 B1 | 11/2006 |
| KR | 20090097620 | 9/2009 |
| WO | WO2009148892 A1 | 12/2009 |
| WO | WO2010054373 A2 | 5/2010 |

OTHER PUBLICATIONS

Non-Final Office Action for U.S. Appl. No. 12/570,945, mailed on Aug. 20, 2012, Michael Steffen Vance et al., "Unified Interface and Routing Module for Handling Audio Input", 12 pages.

Non-Final Office Action for U.S. Appl. No. 12/570,945, mailed on Jul. 18, 2013, Michael Steffen Vance et al., "Unified Interface and Routing Module for Handling Audio Input", 15 pages.

PCT Search Report and Written Opinion mailed Aug. 30, 2011 for PCT Application No. PCT/US11/37927, 9 pages.

Final Office Action for U.S. Appl. No. 12/570,945, mailed on Mar. 18, 2013, Michael Steffen Vance et al., "Unified Interface and Routing Module for Handling Audio Input", 15 pages.

Office action for U.S. Application No. 12/570,945, mailed on Jun. 19, 2014, Vance et al, "Unified Interface and Routing Module for Handling Audio Input", 16 pages.

Extended European Search Report mailed Nov. 4, 2014 for European patent application No. 10821069.1, 6 pages.

Final Office Action for U.S. Appl. No. 12/570,945, mailed on Feb. 19, 2014, Michael Steffen Vance, "Unified Interface and Routing Module for Handling Audio Input", 15 pages.

* cited by examiner

GENIUS BUTTON SECONDARY COMMANDS

REFERENCE TO PRIORITY APPLICATIONS

This application is a continuation-in-part of and claims the benefit and priority to U.S. patent application Ser. No. 12/570,945, titled, "Unified Interface and Routing Module for Handling Audio Input", filed on Sep. 30, 2009 and also claims the benefit and priority to Provisional U.S. Patent Application No. 61/348,183, titled, "Genius Button Secondary Commands", filed on May 25, 2010, to the same inventor herein, the entire disclosure of which is incorporated by reference herein.

BACKGROUND

Over the past thirty years, telephony has significantly evolved from the once-ubiquitous public switched telephone network service. Advances in technology have added an ever increasing array of features and capabilities to telecommunication devices, such as touch screens, video and still cameras, web browsing capabilities, email sending and receiving capabilities, music and video download, storing and playback capabilities, calendar and contact managing capabilities, global positioning system (GPS) location and navigation capabilities, game playing capabilities, and television capabilities, to name a few. Many of these features and capabilities are provided through specialized applications resident on the telecommunication devices. For example, many telecommunication devices allow the user to further customize the telecommunication device through custom configuration options or by adding third-party software. Such software is available for many different functions, not limited to communications.

In addition, traditional components have been utilized to provide new capabilities. The microphones of telecommunication devices, for example, are now used for capturing a user's audio input outside the context of a phone call between the user and another person or system. Applications, such as those mentioned above, accept and process audio input provided through a telecommunication device microphone. Such applications may utilize audio input to create recorded audio notes, voice annotations of a picture, or search queries to be executed on a remote search engine. While these numerous applications all utilize audio input, each provides a different interface and requires different user inputs to initiate the capture of audio input. The captured audio input is then processed by the application triggering the audio capture and is utilized only for the purposes of that application

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Overview

Described herein are telecommunication devices configured with unified audio interfaces and audio routing modules for capturing and handling audio input provided to the telecommunication devices. The unified audio interface includes a dedicated key or button, such as a physical or graphical key, which can be pressed, pressed and held, or otherwise actuated regardless of the execution context of the telecommunication device having the button/key. For example, the button/key may pressed during an audio communication (e.g., telephone call) or while interacting with an application, such as an email application, a text messaging application, instant messaging application, or any other sort of application or process of the telecommunication device. Upon detecting a press or actuation of the button/key, the unified audio interface captures audio input from a user of the telecommunication device or ambient audio in the area of the telecommunication device and provides the audio input to one or more audio recognition modules, which includes at least a speech recognition component. After audio recognition is performed, the resulting recognized audio input, such as a text translation of speech received from the user of the telecommunication device, is received by an audio routing module of the telecommunication device. The audio routing module evaluates the audio input to determine whether the audio input should be handled as an audio command, as a request of telecommunication device application(s), or as a network search request.

In various implementations, the audio routing module utilizes configurable rules or priorities, such as user-configurable or carrier-configurable rules or priorities, in determining how the audio input should be handled. The audio routing module may also or instead rely on a collection of recognized commands which, when encountered within the audio input, indicate that the audio input is to be handled as a command. The audio routing module may also be associated with an application programming interface (API) which enables developers of applications for the telecommunication device to register with the telecommunication device and to provide commands or macros which the audio routing module may utilize in determining how to handle the audio input.

In some implementations, the unified audio interface detects the press or actuation of the button/key while the telecommunication device is engaged in communication with another device. Upon detecting the press or actuation, the telecommunication device may capture, process, and evaluate the audio input. In evaluating the audio input, the audio routing module of the telecommunication device may perform the determining of how to handle the audio input based at least in part on a context or data associated with the communication with the other device.

Illustrative Environment

Figure 1:
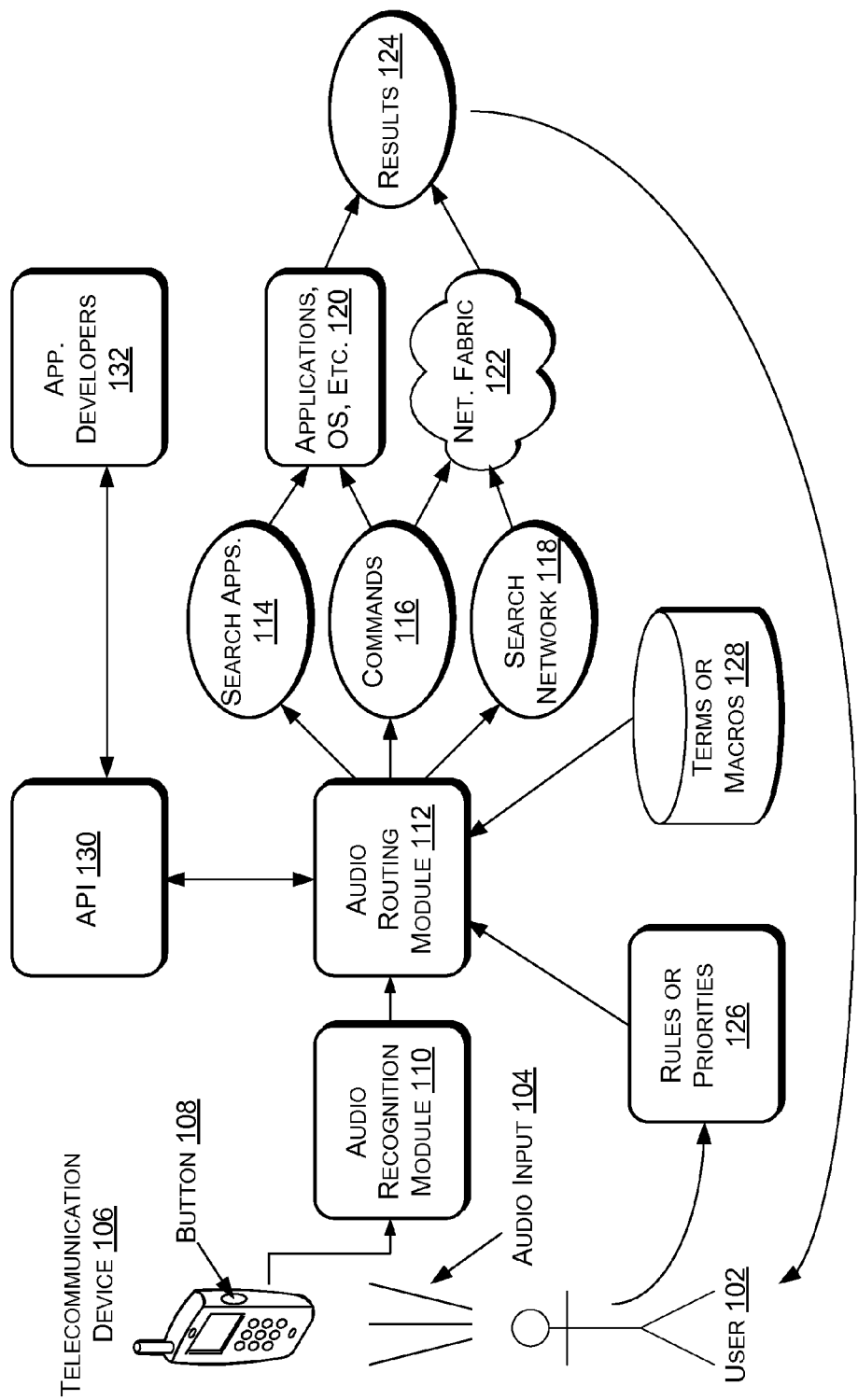
FIG. 1 illustrates an overview of a telecommunication device configured with a unified audio interface and audio routing module, in accordance with various embodiments.

FIG. 1 illustrates an overview of a telecommunication device configured with a unified audio interface and audio routing module. As shown, a telecommunication device 106 receives audio input 104 from a user 102 of the telecommunication device 106. Capture of the audio input 104 may be triggered by the user 102 pressing or actuating a button or key 108 of the telecommunication device 106. Once the audio input 104 is captured, an audio recognition module 110, which includes at least a speech recognition component, may recognize the audio input 104, performing, for example, audio to text translation. The recognized audio input 104 may then be evaluated by an audio routing module 112, the audio routing module 112 determining whether the recognized audio input 104 should be handled as a request 114 of an application or process of the telecommunication device 106, as a command 116, or as a network search request 118. Based on the evaluating, the audio routing module 112 may route the recognized audio input 104 to a telecommunication device application, OS, process, etc. 120 or to a location available via a networking fabric 122 for execution or processing of the recognized audio input 104. Results 124 of the executing or processing may then be provided to the user 102 via the telecommunication device 106.

In various implementations, the audio routing module 112 performs the determining based on configurable rules or priorities which may be added or modified by the user 102 via a rules or priorities process 126 or by a carrier. Also or instead, the determining may be performed based on commands or macros stored in a term or macro data store 128. In some implementations, commands or macros are registered with the audio routing module 112 via an API 130. The API 130 may be utilized by developers 132 of applications or processes for the telecommunication device 106 to register with or interact with the audio routing module 112.

As illustrated, the telecommunication device 106 that captures the audio input 104 may be any sort of computing device known in the art. For example, the telecommunication device 106 may be a telecommunication device such as a mobile phone or a PDA, a landline phone, an Internet phones, or may be a media player, a personal computer (PC), a laptop, a netbook, a reading device or any sort of mobile or stationary computing device. As mentioned above, the telecommunication device 106 may have a button or key 108. The button or key 108 may be disposed on a location on a shell or casing of the telecommunication device 106, on a headset associated with the telecommunication device 106, or rendered on a display of the telecommunication device 106, as well as applications, OS, etc. 120. Also, the telecommunication device 106 may be configured with or store any one or more of the audio recognition module 110, the audio routing module 112, the rules or priorities process 126, the term or macro data store 128, and/or the API 130. An example telecommunication device 106 is illustrated in greater detail by FIG. 3 and is described further below.

In some implementations, the telecommunication device 106 or an associated headset may include a microphone or some other means of capturing audio input 104. The audio input 104 may be any sounds captured by the microphone/capturing means either while the button/key 108 is pressed/actuated and held, during a pre-determined time period following the press/actuation, or following a first press/actuation until a second press/actuation is received. In one implementation, the telecommunication device 106 is configured with a signature/identifier of the user's audio that can be used to filter audio input 104 prior to processing the audio input 104. Such a signature/identifier may have been previously captured using the telecommunication device 106 or another device and may comprise a pre-determined string of words that the user 102 is asked to read aloud. In another implementation, rather than requiring a signature/identifier unique to the user 102, the telecommunication device 106 may be configured with a signature/identifier for a language that can be used to filter the audio input 104 to ensure that the audio input 104 comprises spoken words belonging to a given language. In other implementations, the audio input 104 may be received as an audio file from another computing device, the other computing device acting as a proxy for the user 102.

In various implementations, the button/key 108 may be a physical control disposed on a casing of the telecommunication device 106. Such a control may be disposed on a front, side, top, bottom, or back of telecommunication device 106 and may signal that it has been pressed or actuated through traces or by contact with a capacitive surface. In one implementation, the button/key 108 may be one of a plurality of keys of a keyboard. The button/key 108 may include a physical control that is pressed towards the telecommunication devices or a switch that is slid or toggled relative to the plane of the telecommunication device 106 on which the button/key 108 is disposed. In one implementation, the button/key 108 is disposed on a removable, attachable shell which mates with the cover/casing of the telecommunication device 106. In a further implementation, the button/key 108 may be a dedicated button/key associated with initiating an audio capture process. Such a dedicated button/key may not be re-programmable or re-assignable by the user 102. In another implementation, the button/key 108 is disposed on a headset associated with the telecommunication device 106.

Figure 6:
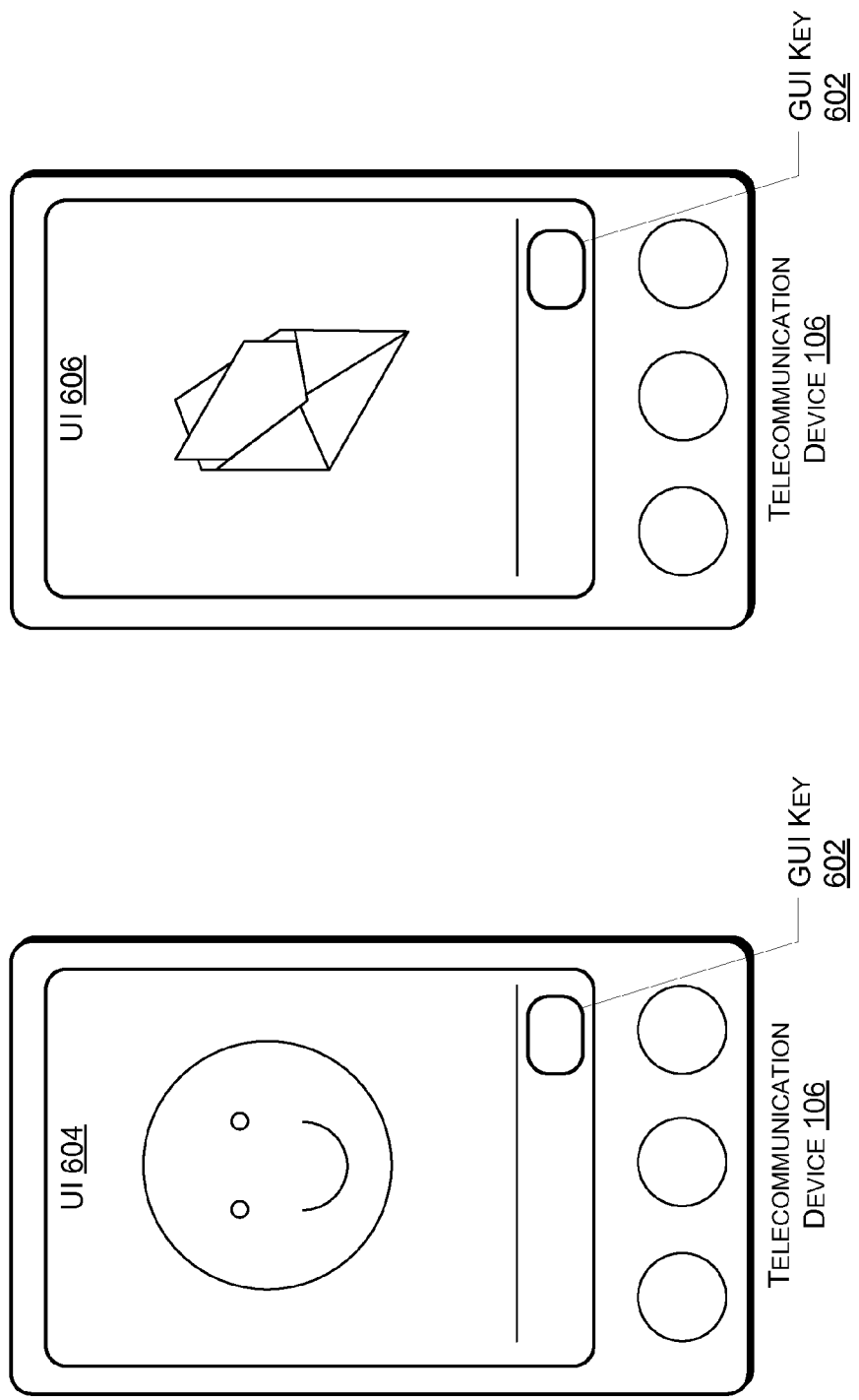
FIG. 6 illustrates example user interfaces of a telecommunication device, each rendering a dedicated key, in accordance with various embodiments.

In other implementations, as illustrated further in FIG. 6, the button/key 108 is a graphic user interface (GUI) key which is rendered to the display of the telecommunication device 106, the display being a touch sensitive display which comprises a capacitive surface or a set of light sensors. The GUI key 108 may be rendered on each and every user interface (UI) displayed by the telecommunication device 106, including UIs such as menus, application interfaces, and other interfaces of the telecommunication device 106. In one embodiment, the GUI key 108 is located in the same place relative to the bounds of the telecommunication device display in each displayed UI. Thus, by making the GUI key 108 available on every display, the GUI key 108 is made available regardless of the execution context of the telecommunication device 106.

The button/key 108 and the associated processes for capturing audio input 108 may comprise a unified audio interface for the capture of any commands, requests, queries, or other interactions that a user 102 may have to be executed or processed on the telecommunication device 106. Either while the button/key 108 is pressed/actuated and held, between two presses/actuations of the button/key 108, or for a pre-determined time period thereafter, the unified audio interface captures audio input 104. As mentioned above, it may even filter the audio input 104. Once the audio input is captured and stored in temporary storage (such as a buffer) or in permanent storage, the unified audio interface may provide the audio input 104 to one or more audio recognition modules 110 which includes at least a speech recognition module. In another implementation, the unified audio interface may provide the audio input 104 to an audio recognition module 110 in real time, as the audio input 104 is received.

Figure 2:
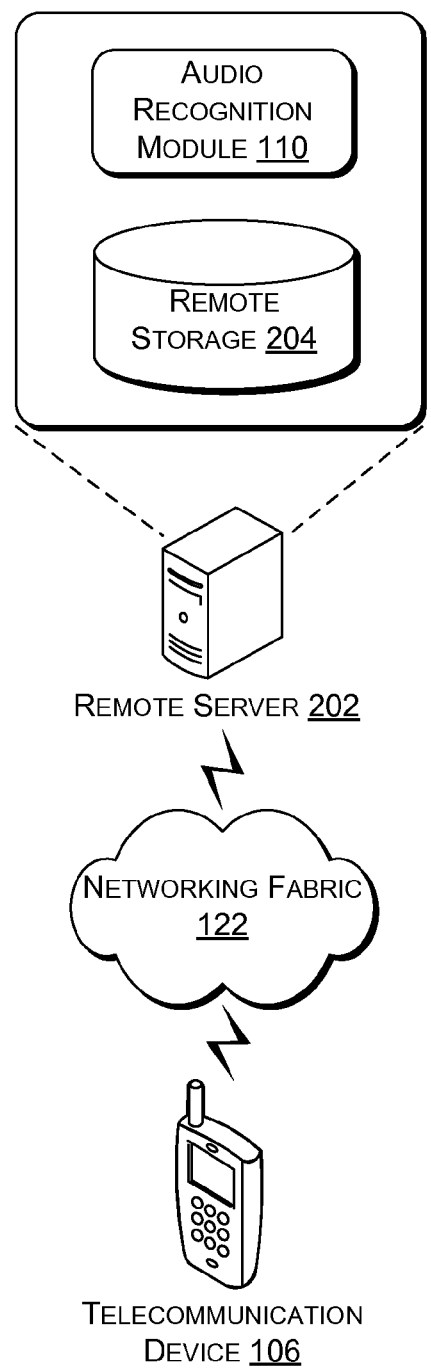
FIG. 2 illustrates a network view showing a telecommunication device in communication with a remote server having audio recognition capabilities, in accordance with various embodiments.

In various implementations, the audio recognition module 110 may comprise any process or processes capable of receiving audio input 104 in the form of an audio file or buffer and producing a text translation of the audio input 104, the text translation comprising "recognized" audio input 104. The audio recognition module 110 may be a process of the telecommunication device 106, of a remote server (as shown in FIG. 2), of a telecommunication service provider, or of some other remote service provider. In one implementation, the audio recognition module 110 may comprise processes implemented on multiple devices. As mentioned above, in one implementation, the audio recognition module 110 may receive the audio input 104 in real time, as it is provided.

The audio recognition module 110 may utilize any technique or techniques known in the art to recognize the received audio input 104. In some implementations, the audio recognition module 110 may utilize learning models that make progressively better translations of the audio input 104 based on results of previous translations (e.g., such as whether the user is required to choose between multiple options to disambiguate the audio input 104). The audio recognition module 110 may start with a learning model associated with a language or associated with a specific group sharing a language and some common trait (e.g., age). The learning model may also be selected and pre-loaded by a carrier, for example, based on a billing zip code of the user 102. In one implementation, the audio recognition module 110 may then refine that learning model to take into account idiosyncratic patterns (i.e., voice characteristics) in the user's speech. The refined learning model can comprise a speaker profile and be associated with a user login or identifier, with a telecommunication services account, or with the telecommunication device 106. If associated with a user login, identifier, or account, then the same refined learning model may be accessed and utilized by multiple telecommunication devices.

In some implementations, the audio recognition module 110 may facilitate training of the learning model based on inputs of user 102. Either in response to the user 102 selecting a training mode or automatically at pre-determined training opportunities, the audio recognition module 110 may allow the user to speak a number of different phrases and, if necessary, select between disambiguating options. Based on the training, the audio recognition module 110 may refine and update the learning model.

In further implementations, rather than utilizing a learning model customized for the individual user, the audio recognition module 110 can utilize a group learning model that is refined and updated based on results of translations performed for users of the group.

In some implementations, the audio recognition module 110 or another process of the telecommunication device 106 may provide potential meanings of the audio input 104 to the user 102 to resolve the meaning of the audio input 104 when the audio input 104 is ambiguous. For example, if the user 102 were to say something that is recognized as "brable", the user could either have said (or be trying to say) "stable" or "table."

The audio recognition module 110 or process could provide both of these and perhaps other suggestions to the user 102 for the user 102 to select from. Such suggestions and selections could be made and received either through a GUI or through further audio output/input. In one implementation, the audio recognition module 110 might recognize a term, but not recognize whether the user 102 intends the term as a command for an application or as a search request. If the user 102 were to say "wallpaper", the user 102 could mean "change the wallpaper" or "show me wallpapers", the first being a command and the second being a search request that could be fulfilled by an application or search service. Again, the audio recognition module 110 or process could provide both of these and perhaps other suggestions to the user 102 for the user 102 to select from.

In further implementations, audio recognition module 110 may perform the disambiguation of the audio input 104 with reference to application or context information, such as contact lists, browsing history, a call log, etc. For example, if user 102 speaks the name "Thorbjorn", the audio recognition module 110 may have trouble understanding the input (i.e., which "Thorbjorn" is being referred to). To disambiguate the input, the audio recognition module 110 may examine the contact list and note that the name Thorbjorn Janssen is included in the list. The audio recognition module 110 may then either assume that the contact is who/what the user 102 was referring to, or may suggest the contact as one of a plurality of disambiguation suggestions for the user 102 to select from. If multiple Thorbjorns are found in the contact lists, the audio recognition module 110 may examine the call log and guess whichever Thorbjorn has been called the most as the Thorbjorn being referred to.

In some implementations, as mentioned above, the audio recognition module 110 may receive the audio input 104 in real time, as the user 102 is speaking it. To speed along disambiguation, the audio recognition module 110 may present to the user 102 a guess as to what the user 102 is saying as the user 102 is saying it. Such a guess may be refined repeatedly as the user 102 is speaking. In one implementation, if the audio recognition module 110 is guessing incorrectly, the user 102 may terminate the audio input 104 (by, e.g., releasing the button/key 108) and may again attempt to provide audio input 104. The audio recognition module 110 may interpret such a cancellation as an incorrect guess and may refine a learning model accordingly.

Once the recognized audio input 104 has been generated by the audio recognition module 110, the audio recognition module 110 may provide the recognized audio input 104 to the audio routing module 112. In some implementations, before providing the recognized audio input 104 to the audio routing module 112, the audio recognition module 110 may provide the recognized audio input 104 back to the user 102 to confirm that the recognized audio input 104 matches the audio input 104. The recognized audio input 104 may be displayed to the user, or may be translated by the audio recognition module 110 from text to audio and may be played to the user 102 by the telecommunication device 106. In one implementation, further action may not proceed until the user 102 confirms that the recognized audio input 104 is correct.

In various implementations, the audio routing module 112 comprises processes and rules for evaluating the recognized audio input 104 to determine how the recognized audio input 104 should be handled. The rules and processes comprising the audio routing module 112 may be implemented entirely or partially on the telecommunication device 106, or may be implemented on another device, such as a server of a telecommunication service provider. The audio routing module 112 may be implemented as a state machine comprising a finite number of states, each state associated with a different mechanism for handling the recognized audio input 104. Such states could be associated with mechanisms for handling the recognized audio input 104 as a request 114 made of a telecommunication device application or process, as an audio command 116, and/or as a network search request 118.

The audio routing module 112 could determine the state/mechanism based on a set of rules and/or priorities, such as the configurable rules or priorities added or modified by the rules or priorities process 126 (described further below) or by a carrier. For example, the set of rules may include a first rule that attempts to treat the recognized audio input as an audio command 116. In accordance with this rule, the audio routing module 112 may determine whether the recognized audio input 104 includes any known commands, such as the commands stored in the terms or macros data store 128 (described further below). Example commands may be navigational commands, such as a command to direct a user interface (UI) to open an application, return to a home screen, or perform other actions navigational operations within the UI. If the audio routing module 112 determines that the recognized audio input 104 includes one or more of the commands, then the audio routing module 112 may handle the recognized audio input 104 as an audio command 116. If not, then the audio routing module 112 may next attempt to handle the recognized audio input 104 as a request 114 made of a telecommunication device application or process or as a network search request 118, depending on priorities specified by the set of rules. In one implementation, the rules may give priority to first attempting to handle the recognized audio input as a request 114 made of a telecommunication device application or process. In such an implementation, the audio routing module 112 may determine whether the recognized audio input 104 is associated with any sort of macros or data indicating an association between specific inputs and an application or process. For example, a weather application may be associated with a set of terms or phrases and/or may include a macro for recognizing certain terms or phrases and invoking the weather application. Such macros and terms or phrases may also be stored in the terms or macros data store 128. If the audio routing module 112 does not find a match or application/process capable of handling the recognized audio input 104, then the recognized audio input 104 may be treated as a network search request 118 and sent, for example, to a search service provider, such as Google® or Yahoo®.

In another implementation, the rules may give priority to first attempting to handle the recognized audio input as a network search request 118. The audio routing module 112 may submit the recognized audio input 104 as a query to a search service. If the search results indicate, however, that no matches were found for the recognized audio input 104, then the audio routing module 112 may handle the recognized audio input as a request 114 made of a telecommunication device application or process. As described above, handling the recognized audio input 104 as a request 114 may involve comparing the recognized audio input 104 to terms or phrases associated with an application or to macros for interacting with an application, such as macros for invoking and passing the recognized audio input 104 to the application. Such terms or macros may be stored in the terms or macros data store 128.

In some implementations, the audio routing module 112 may determine how to handle the audio input 104 based on the interaction of the user 102 with the button/key 108. For example, if the user 102 presses and holds the button/key 108 for a predetermined amount of time (e.g., 3 seconds), the audio routing module 112 may handle audio input 104 as a query made of telecommunication device applications 114. If the user 102 presses and quickly releases the button/key 108, however, the audio routing module 112 may handle the same audio input 104 as a network search request 118. To enable this differential handling based on button/key 108 pressing behavior, different pressing behaviors may be associated with different rules or priorities.

In further implementations, the audio routing module 112 or an associated process may gather context information about the telecommunication device, such as location information, date/time, contacts, call log, browsing history, application execution context, etc., and perform the evaluating based at least in part on the context information. For example, if the user 102 is engaged in a phone call with another user and, while engaged in the phone call, provides as recognized audio input 104 the command "send calendar", the audio routing module 112 may determine that the user 102 wishes to send his or her calendar to the other user based on the fact that the user is engaged in a phone call with the other user. As mentioned above, to provide audio input 104 while engaged in another activity, including an activity that also involves providing audio input, the user 102 may press the button or key 108, which will cause the audio input 104 received during or after the press to be treated as the audio input 104 that is to be evaluated by the audio routing module 112. In other implementations, the execution context may indicate that the user 102 is involved in a chat session, an instant messaging session, or an email message exchange by writing the communication, speaking the communication, reading the communication, and/or listening to the communication. Such other execution contexts may each be taken into account by the audio routing module 112 in determining how to handle the recognized audio input 104. In one implementation, the context may provide a default that may be overridden by the contents of the recognized audio input 104. For example, if the user 102 were to say "send calendar", the audio routing module 112 may interpret the recognized audio input 104 as a command 116 to send the calendar to the other user with whom the user 102 is currently communicating. If, on the other hand, the user 102 specifies a name in the audio input 104, such as the name of a contact of the user 102 stored in a contact list, the audio routing module 112 may ignore the context. Thus, if the user 102 were to say "send calendar to Eric Smith" while engaging in a phone call with Betty Crocker, the audio routing module 112 may send the calendar to Eric Smith rather than Betty Crocker. In one implementation, the audio routing module 112 may be configured (by rules or priorities) to, for example, send the calendar to both the name specified and the current communication partner.

In some implementations, while engaged in communication with another user and while providing audio input 104, the audio input 104 may, by default, not be relayed to the other user. In such embodiments, the default may be associated with a rule or priority which may be configured by user 102 or a carrier. Thus, for example, the user 102 may change the rule or priority to provide the audio input 104 by default. Also, in one implementation, words such as "private" or "public", when included in the audio input 104, may be used to override a default.

In a further example, if the gathered context information is location information and the audio routing module 112 determines that the recognized audio input 104 should be handled as a network search request 118, the audio routing module 112 may include the location information as part of the network search request 118.

In some implementations, the audio commands 116 may include both commands executed on the telecommunication device 106 and commands executed on a remote server. Such commands 116 may include commands related to telecommunication device settings, telecommunication device personalizations, and/or on telecommunication device applications, such as applications, OS, etc. 120. For example, the audio routing module 112 may determine that the recognized audio input 104 matches a command associated with an airplane mode setting of the telecommunication device 106, and the audio routing module 112 may handle the command 116 by setting the airplane mode according to the recognized audio input 104 (e.g., turn airplane mode on or off). The audio routing module 112 may be configured to execute the command 116 or invoke an application or process to execute the command 116.

In another example, the audio routing module 112 may determine that the recognized audio input 104 matches a command associated with a query of a service provider for account information. Upon making the determination, the audio routing module 112 may provide the recognized audio input 104 to the service provider, which may comprise a remote server, as a query for account information.

In further implementations, the recognized audio input 104 may be handled as a command 116 that is simultaneously executed on multiple applications or settings. If the audio routing module 112 determines that the recognized audio input 104 matches terms or phrases associated with multiple applications, then the audio routing module 112 may handle the recognized audio input as a command 116 to be executed on each of those applications or settings. For example, if the recognized audio input 104 is determined to include the words "turn on away message", which match phrases associated with each of an email application and a text messaging application, then the audio routing module 112 may handle the input by executing (or invoking the applications to execute) the command 116 on both applications simultaneously. In one implementation, whether the recognized audio input 104 is executed on both applications simultaneously or only on one prioritized application may be determined by the user-configurable rules and priorities discussed above and below.

In some implementations, the recognized audio input 104 may be handled as a set of audio commands 116 associated with a macro. For example, if the recognized audio input 104 is "tell my wife that I will be home late for dinner", the audio routing module 112 may locate a macro associated with the term "tell" which launches an email, call, or message with the contents "home late for dinner". Those contents are then communicated to the person named in the recognized audio input 104.

In various implementations, the applications, OS, etc. 120 comprises any executing instructions on the telecommunication device 106. Such instructions include, for example, an OS of the telecommunication device 106, drivers for hardware components of the telecommunication device 106, applications providing interfaces to settings or personalizations of the telecommunication device 106, applications made specifically for the telecommunication device 106, and third party applications. Collectively these applications/processes are hereinafter referred to as applications, OS, etc. 120. Such applications, OS, etc. 120 may be entirely or partially implemented on the telecommunication device 106. In some implementations, the applications, OS, etc. 120 may be implemented partially on another device or server.

In some implementations, as mentioned above, the applications, OS, etc. 120 may be invoked by the audio routing module 120 to execute a command 116 or a request 114. Such commands 116 may ask the applications, OS, etc. 120 to perform some task, such as initiate a call to a person specified in the recognized audio input 104 or change a setting of an application, OS, etc. 120. The requests 114 may ask the applications, OS, etc. 120 to return some data, such as the weather at a specified location, or pictures taken on a specified date. To execute both the commands 116 and requests 114, the audio routing module 112 must initialize an executing instance of the application, OS, etc. 120—or discover such an instance—and invoke a function of the application, OS, etc. for receiving and processing recognized audio input 104 and associated commands 116 and requests 114. Such recognized audio input 104 and an indication of the sort of request 114 or command 116 may be passed as parameters to the function of the application, OS, etc. 120. To initialize and invoke the application, OS, etc. 120, the audio routing module 112 may make use of telecommunication-device-level macros stored in the terms or macros data store 128. For the OS and for applications 120 that come loaded on the telecommunication device 106 at the time of its sale to the user 102, the macros may also be provided and stored. For third party applications 120 installed by the user 102 on the telecommunication device 106, the macros may be received and stored at the time of installation, or at some later time. In some implementations, described further below, macros may be built for the telecommunication device 106 by application developers 132 of third party applications 120 using the interfaces provided by the API 130 associated with the telecommunication device 106.

In further implementations, the application, OS, etc. 120 invoked by the audio routing module 112 may also be being used by the user 102 to enable communication with another user of another device. For example, the application, OS, etc. may be a telephony application 120 providing a local endpoint of a phone call. In such an example, the received command 116 may be a command 116 to conference in a third party. In response to receiving the command 116, the telephony application 120 may call and conference in the third party. In other implementations, the user 102 may be interacting with one application, OS, etc. 120, and the audio routing module 112 may invoke a different application, OS, etc. 120. For example, the user 102 may be using the telephony application 120 to engage in a phone call with another user, and the audio routing module 112 may initialize and invoke an email application 120 to, for example, email a calendar to another user, such as the other user conversing with the user 102 through the phone call.

In various embodiments, rather than executing a command or request contained in the recognized audio input 104 locally, the audio routing module 112 may send the determined command 116 or network search request 118 to a remote computing device via a networking fabric 122. The networking fabric 122 represents any one or more networks known in the art, such as cellular networks and/or data networks, including wide area networks (WANs), local area networks (LANs), personal area networks (PANs), and/or the Internet. For example, telecommunication device 106 could be connected to both cellular and data networks and the remote computing device could be connected exclusively to data networks. A connection between one of the telecommunication devices 106 and the remote computing device may be through a number of routers, base stations, and/or telecommunication devices acting as bridges between cellular and data networks. Communications between the remote computing device and telecommunication device 106 utilize any sort of communication protocol known in the art for sending and receiving messages, such as the Transmission Control Protocol/Internet Protocol (TCP/IP) and/or the Hypertext Transfer Protocol (HTTP).

The remote computing device, in some implementations, may be associated with a search engine of a search service provider. Such a search engine may receive the recognized audio input 104 in the form of network search request 118 and may handle the network search request 118 as a search query. The search engine may then provide the search results to the telecommunication device 106 via the networking fabric 122. In other implementations, the remote computing device may be associated with the telecommunication service provider and may provide account information in response to receiving the recognized audio input 104 as a command/request for the account information. In yet other implementations, the remote computing device may be any sort of computing device known in the art, such as a web server, database server, or any other sort of server or device and may have any sort of application or data known in the art which may be the object of a command 116 or request 118 by the audio routing module 112 of the telecommunication device 106.

In various implementations, the results 124 of the execution of the request 114, command 116, or network search request 118 may be received by the telecommunication device 106 from the application, OS, etc. 120 or from a remote computing device via the networking fabric 122. The results 124 may then be provided to the user 102 in some form, such as via a UI or audio output. If the recognized audio input 104 was handled as a command 116 by the audio routing module 112, the results 124 may simply comprise an indication that the command 116 was executed successfully or an error message indicating that the command 116 did not execute successfully. In one implementation, no results 124 may be provided in response to execution of a command 116. If the recognized audio input was handled as a request 114/118, then the information that was the object of the request 114/118 may comprise the results 124 that are provided to the user 102. In one implementation, if the user is engaged in communication with another user of another device, the results 124 may be provided to both users. Whether the results 124 are provided only to the user 102 or to the user 102 and other users may be determined with reference to the rules or priorities set by the rules or priorities process 126.

In various embodiments, as mentioned above, the audio routing module 112 may perform the evaluation of recognized audio input 104 based on configurable rules or priorities. Of those configurable rules or priorities, the user-configurable rules or priorities may be accessed, modified, added, or deleted by a rules or priorities process 126. The rules or priorities process 126 may be implemented on the telecommunication device 106, on another remote device or devices, or partially on both. In some implementations, the rules or priorities process 126 may include an audio and/or visual interface enabling users to have read and write access to the rules and priorities utilized by the audio routing module 112. In one implementation, the user 102 may be given only read access to some portion of the rules or priorities, or no access at all. The user 102 may add to, modify, or delete any one or more of the rules or priorities by providing audio input, text entry, and/or by selection of one or more UI controls.

In some embodiments, the rules or priorities may include one or more of a priority for attempting to handle the recognized audio input 104 as a command 116 before handling it as a request 114/118, a priority for attempting to handle the recognized audio input 104 as a request 114 of a telecommunication device application 120 before handling it as a network search request 118, or a priority for attempting to handle the recognized audio input 104 as a network search request 118 before handling it as a request 114 of a telecommunication device application 120. Additional rules or priorities may include a priority for one search service over another, a priority for simultaneous submission of a command 116 or request 114/118 to multiple applications 120 or remote devices, a priority for one application 120 over another if the command 116 or request 114 could be executed by either, or a priority for providing results 124 to only the user 102 or to both the user 102 and other user(s) in communication with the user 102. Also, any other sort of rules or priorities which may prioritize one course of action over another may be utilized. In some implementations, the rules or priorities may be stored in a rules or priorities data store (not shown).

In various implementations, as mentioned above, the audio routing module 112 may also or instead perform the evaluation of recognized audio input 104 based on commands or macros stored in a terms or macros data store 128. The terms or macros data store may, in some embodiments, comprise a database, such as a relational database, a structured database, an unstructured database, or an unstructured file. In addition to storing the terms or macros, the terms or macros data store 128 may also store metadata associated with the terms or macros. For example, the data store 128 may store metadata identifying the application associated with a given macro. Such a terms or macros data store 128 may be implemented locally on the telecommunication device 106 or remotely on another device, such as a server of a telecommunication service provider, or may be implemented in part locally and in part remotely. Further, the terms or macros data store 128 may respond to requests from the audio routing module 112 by providing the contents sought by the audio routing module 112.

In some embodiments, the terms stored in the terms or macros data store 128 may include terms or phrases recognized as commands or requests associated with telecommunication device settings, personalizations, or applications (e.g., local or remote applications). The terms or phrases may come pre-loaded with the telecommunication device 106 when it is purchased or may be provided with a third party application at the time of installation or some later time. In one implantation, the telecommunication device 106 may provide an interface which allows a user to add to, modify, or delete terms or phrases in the terms or macros data store 128.

Also, in some implementations, the macros may comprise executable instructions for initializing an application, such as an application 120, for invoking the application, and for passing the recognized audio input 104 and other information to the application as parameters. The macros may also come pre-loaded with the telecommunication device 106 when it is purchased or may be provided with a third party application at the time of installation or some later time.

In further implementations, the rules or priorities process 126 and/or the terms or macros data store 128 may be accessible via a user interface. Such a user interface may enable the user 102 to see a list of commands, to edit that list, to see rules or priorities, and to edit those rules or priorities. The user interface could also be associated with the audio routing module 112 and/or the audio recognition module 110 and could, for instance, display a list of frequent queries. In one implementation, such a user interface may be associated with an icon, such as an icon on a main menu of the telecommunication device 106 which, when clicked on, pressed, or actuated may launch the user interface.

In various implementations, the terms, phrases, or macros may be registered with the telecommunication device 106 via an API 130 associated with the audio routing module 112.

The API 130 may comprise a set of interfaces, such as a set of callable functions, which may be utilized by application developers 132 in building applications 120 for the telecommunication device 106 and other such devices. The callable functions may include functions for registering terms or phrases that are to be recognized as command or requests associated with the application 120, functions for notifying the audio routing module 112 of the ability of the application 120 to receive commands or requests, and functions for requesting more information from the audio routing module 112. Any other number of functions useful for making available the functionalities of the application 120 and for enabling communication between the audio routing module 112 and the application 120 may also be provided by API 130. In some implementations, the macros, applications 120, and/or installer application(s) associated with the applications 120 may be capable of calling the functions of API 130. The API 130 may be implemented entirely or partially on the telecommunication device 106.

FIG. 2 illustrates a network view showing a telecommunication device in communication with a remote server having audio recognition capabilities including at least a speech recognition component. As shown, a telecommunication device 106 may be in communication with a remote server, such as remote server 202, via the networking fabric 122. Both the telecommunication device 106 and networking fabric 122 are described above in greater detail above. As further shown, the remote server 202 may implement the audio recognition module 110 and a remote storage 204.

In various implementations, the remote server 202 may be any sort of computing device known in the art, except for the audio recognition module 110 and remote storage 204. The remote server 202 may be a personal computer (PC), a laptop computer, a workstation, a server system, a mainframe, a telecommunication device, a personal digital assistant (PDA), a set-top box, or any other computing device known in the art. In other implementations (not shown), the remote server 202 may represent a plurality of computing devices each implementing some portion of the functionality represented by the audio recognition module 110 and remote storage 204. For example, remote server 202 could include a database server storing the remote storage 204 and a web server implementing the audio recognition module 110, as well as other devices. In one implementation, remote server 202 may refer to a first server device associated with a carrier (telecommunication service provider) and a second server device associated with an audio recognition service provider. In such an embodiment, the first server device may store the remote storage 204 and communicate with both the telecommunication device 106 and the second server device, and the second server device may include the audio recognition module 110 and communicate with the first server device, receiving the audio input 104 through the first server device.

In some implementations, the remote server 202 may be a server associated with an audio recognition service or with the telecommunication provider service. The remote server 202 may, in an implementation, receive audio input from the telecommunication device 106, such as audio input 104, and, utilizing the audio recognition module 110, may perform audio to text translation of the audio input, recognizing the audio input. The operations of the audio recognition module 110 are described above in greater detail. In one implementation, if the audio input is ambiguous, the remote server 202 may present optional meanings of the audio input to the user of the telecommunication device 106, either through an interface of the remote server 202 provided over the networking fabric 122 or through an interface provided by the telecommunication device 106.

In performing the speech recognition, the remote server 202 may rely on data stored in a remote storage 204, such as the learning models described above. Such a remote storage 204 may, in some embodiments, comprise a database, such as a relational database, a structured database, an unstructured database, or an unstructured file. The remote storage 204 may store data/learning model(s) associated with login identifiers, with service accounts, or with telecommunication devices.

Illustrative Telecommunication Device

Figure 3:
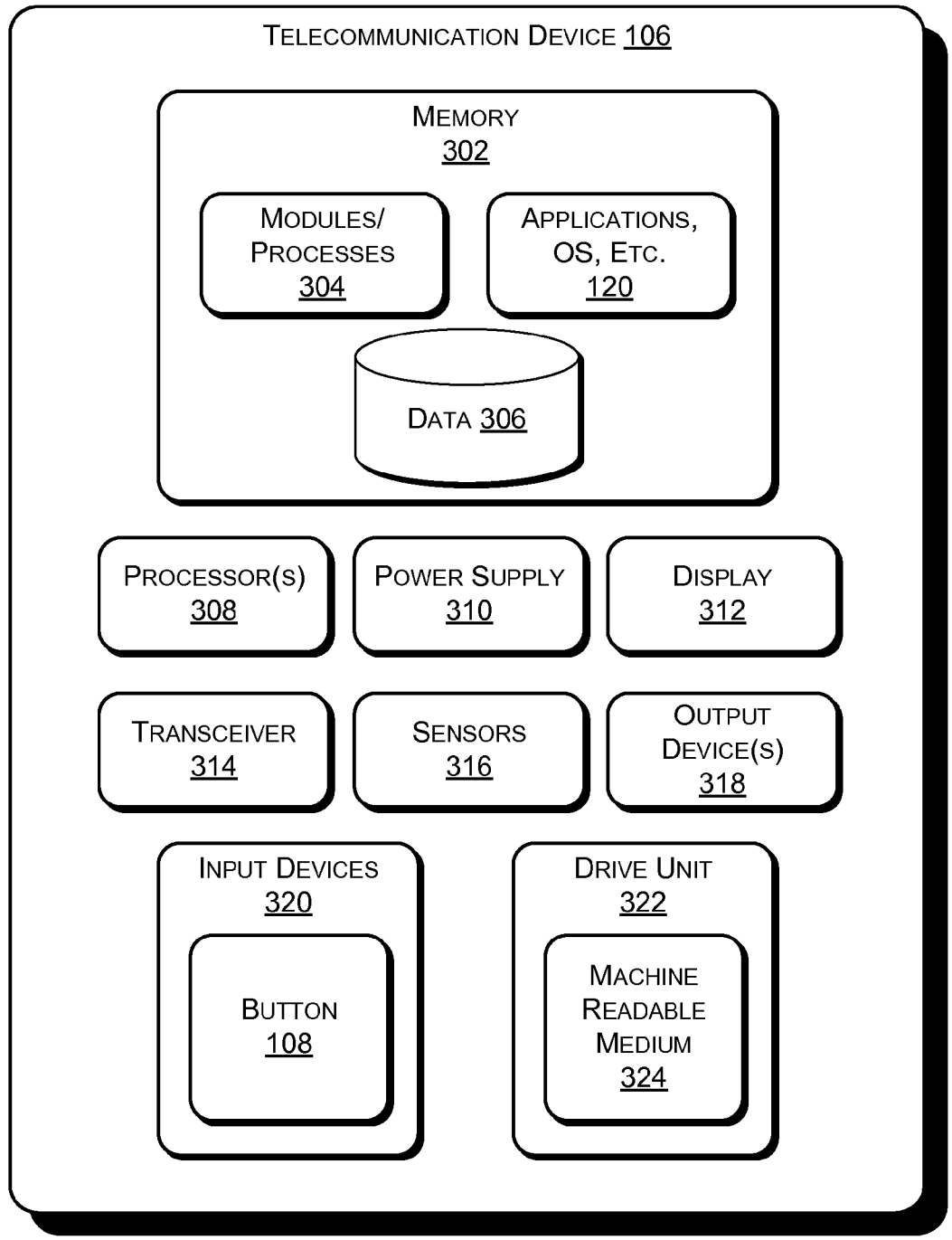
FIG. 3 illustrates a component level view of a telecommunication device, in accordance with various embodiments.

FIG. 3 illustrates a component level view of a telecommunication device, in accordance with various embodiments. As shown, the telecommunication device 106 may include a memory 302, the memory storing modules/processes 304, applications, OS, etc. 120, and data 306. The telecommunication device 106 may further include processor(s) 308, a power supply 310, a display 312, a transceiver 314, sensors 316, output device(s) 318, input devices 320, and drive unit 322. Also, as shown, the input devices may include a button or key 108, and the drive unit 322 may include a machine readable medium 324.

In various implementations, memory 302 may generally include both volatile memory and non-volatile memory (e.g., RAM, ROM, Flash Memory, miniature hard drive, memory card, or the like). Additionally, in some implementations, memory 302 may include a SIM (subscriber identity module) card, which is a removable memory card used to identify a user of the telecommunication device 106 to a telecommunication service provider. The modules/processes 304 of memory 302 may, in some embodiments, include modules and/or processes such as one or more of the above-described audio capture process, the audio recognition module 110, the audio routing module 112, the rules or priorities process, process(es) associated with API 130, and/or any other modules or processes known in the art. Also, as shown, memory 302 may store the above described applications, OS, etc. Further, memory 302 may store data 306. Data 306 may, in some embodiments, include data such as one or more of the above-described user-configurable rules or priorities, the terms or macros data store 128, and/or any other modules or processes known in the art.

In some implementations, the processor(s) 308 may be a central processing unit (CPU), a graphics processing unit (GPU), or both CPU and GPU, or other processing unit or component known in the art.

In further implementations, the power supply 310 may be implemented as one or more batteries. The power supply 310 might further include an external power source, such as an AC adapter or a powered docking cradle for supplementing or recharging the batteries.

In various implementations, the display 312 may be a liquid crystal display or any other type of display commonly used in telecommunication devices. For example, display 312 may be a touch-sensitive touch screen, and can then also act as an input device or keypad, such as for providing a soft-key keyboard, navigation buttons, or the like, as well as key 108 as a GUI key. FIG. 6 illustrates such a touch-sensitive touch screen in further detail.

In some implementations, the transceiver(s) 314 may include any sort of transceivers known in the art. For example, transceiver(s) 314 may include a radio transceiver and interface that performs the function of transmitting and receiving radio frequency communications via an antenna. The radio interface facilitates wireless connectivity between the telecommunication device 106 and various cell towers, base stations and/or access points. Transmissions to and from the radio interface may conducted under control of the OS 120. For example, communications received by the radio interface may be disseminated to application programs 304/120 via the operating system 120, and vice versa Transceiver(s) 314 may also include a near field interface that performs a function of transmitting and receiving near field radio communications via a near field antenna. For example, the near field interface may be used for functions, as is known in the art, such as communicating directly with nearby devices that are also, for instance, Bluetooth® or RFID enabled. A reader/interrogator may be incorporated into telecommunication device 106.

Also, transceiver(s) 314 may include a wireless LAN interface that performs the function of transmitting and receiving wireless communications using, for example, the IEEE 802.11, 802.16 and/or 802.20 standards. For example, the telecommunication device 106 can use a Wi-Fi interface to communicate directly with a nearby wireless access point such as for accessing the Internet directly without having to perform the access through the telecommunication service provider's network.

In various embodiments, sensors 316 may include any sort of sensors known in the art. For example, sensors 316 may include a global positioning system (GPS) transponder for endowing telecommunication device 106 with various GPS capabilities such as navigation, mapping, or the like. Further, telecommunication device 106 may include a motion sensor, such as an accelerometer for determining position, altitude and/or movement of telecommunication device 106, such as for adjusting display orientation, or the like.

In some implementations, the output device(s) 318 may include any sort of output devices known in the art, such as a display (already described as display 312), speakers, or vibrating mechanism, or tactile feedback mechanisms. Output device(s) 318 may also include ports for one or more peripheral devices, such as headphones, peripheral speakers, or a peripheral display.

In various implementations, input devices 320 may include the button or key 108 and any sort of input devices known in the art. For example, input devices may include a microphone (such as a microphone for receiving audio input 104), a keyboard/keypad, or a touch-sensitive display (such as the touch-sensitive touch screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. Button/key 108 has already been described above in great detail and, accordingly, will not be described further herein.

The machine readable medium 324 stores one or more sets of instructions (e.g., software) embodying any one or more of the methodologies or functions described herein. The instructions may also reside, completely or at least partially, within the memory 302 and within the processor 308 during execution thereof by the telecommunication device 106. The memory 302 and the processor 308 also may constitute machine readable media 324.

Illustrative Operations

Figure 4:
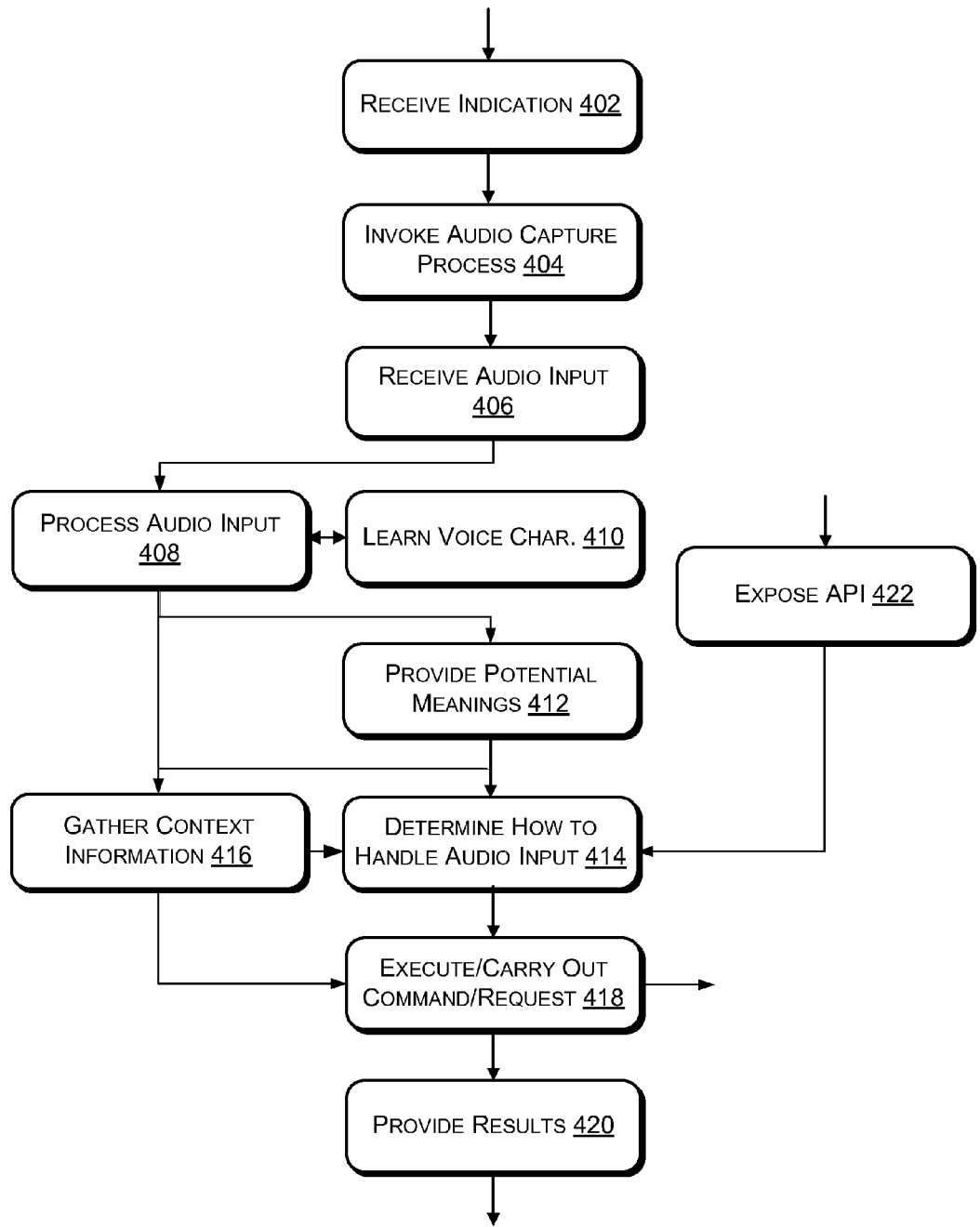
FIG. 4 illustrates a flowchart showing a method of receiving and handling audio input using a telecommunication device, in accordance with various embodiments.

FIG. 4 illustrates a flowchart showing a method of receiving and handling audio input using a telecommunication device. As shown, a telecommunication device, such as telecommunication device 106, may receive an indication that a dedicated key, such as button or key 108, of the unified audio interface has been pressed or actuated, block 402, the dedicated key being reserved for invoking an audio capture process. In one implementation, the dedicated key may be a GUI key, such as GUI key 602, available on each UI screen rendered by the telecommunication device. In response to receiving the indication, the telecommunication device may then invoke the audio capture process, block 404. Next, the telecommunication device may receive the captured audio input, block 406.

The telecommunication device may then process, by an audio recognition module such as audio recognition module 110, the audio input to translate the audio input from audio to text, block 408. The telecommunication device can also learn, by the audio recognition module, voice characteristics of a speaker to improve audio recognition, block 410. Such voice characteristics belong to a speaker profile that is stored on a server and associated with a user login and/or user service agreement. The translating can both be based on the learning and cause occurrence of the learning.

In some implementations, the meaning of the audio input may be ambiguous. In response to detecting ambiguity, the telecommunication device may provide potential meanings of the audio input to resolve the meaning of the audio input, block 412.

Once the audio input has been processed, the telecommunication device may evaluate the audio input to determine whether to handle the audio input as a command, as a request of a telecommunication device application, or as a network search request, block 414, the determining being based on one or more user-configurable rules or priorities. Such evaluating may be performed, for example, by audio routing module 112 and may determine whether to handle the audio input as a command 116, as a request 114 of a telecommunication device application, or as a network search request 118.

In determining how to handle the audio input, block 414, the telecommunication device may determine whether the audio input comprises one or more recognized command words or one or more words associated with telecommunication-device-level macros, such as the terms or macros stored in terms or macros data store 128.

Also, the user-configurable rules or priorities used in performing the determining, block 414, such as the rules or priorities that are manageable through the rules or priorities process 126, may include one or more of a priority for attempting to handle audio input as a command before handling it as a request, a priority for attempting to handle audio input as a request of a telecommunication device application before handling it as a network search request, or a priority for attempting to handle audio input as a network search request before handling it as a request of a telecommunication device application.

Before or while performing the determining, block 414, the telecommunication device may also gather context information about the telecommunication device, block 416. The telecommunication device may then perform the determining, block 414, based at least in part on the context information or may submit the context information with a command or with a request.

After determining how to handle the audio input, block 414, the telecommunication device may execute the determined command, request of the telecommunication device application, or network search request or may provide the determined command, request of the telecommunication device application, or network search request to a system or application for execution, block 418. The telecommunication device application may include applications and processes such as applications, OS, etc. 120, and the network search request may be provided to remote computing devices via a networking fabric such as networking fabric 122. Also, block 418 may include carrying out the commands on telecommunication device settings, telecommunication device personalizations, and/or on telecommunication device applications. Further, the commands may include commands that are executed simultaneously on multiple telecommunication device applications and queries of service providers for account information.

Following execution/carrying out, block 418, the telecommunication device may receive results of the execution or carrying out of the command, request of the telecommunication device application, or network search request, block 420. Such results may include results 124.

At any point during, preceding, or following the execution of operations 402-420, the telecommunication device may expose an API, such as API 130, that enables telecommunication device applications to register with and/or interact with an audio routing module of the telecommunication device which performs the determining, block 422. In some implementations, the API may enable function call-based interaction between the telecommunication device applications and audio routing module while the audio routing module is performing the determining. Also, the API may enable a telecommunication device application to provide recognized commands or macros for use by the audio routing module in performing the determining.

Figure 5:
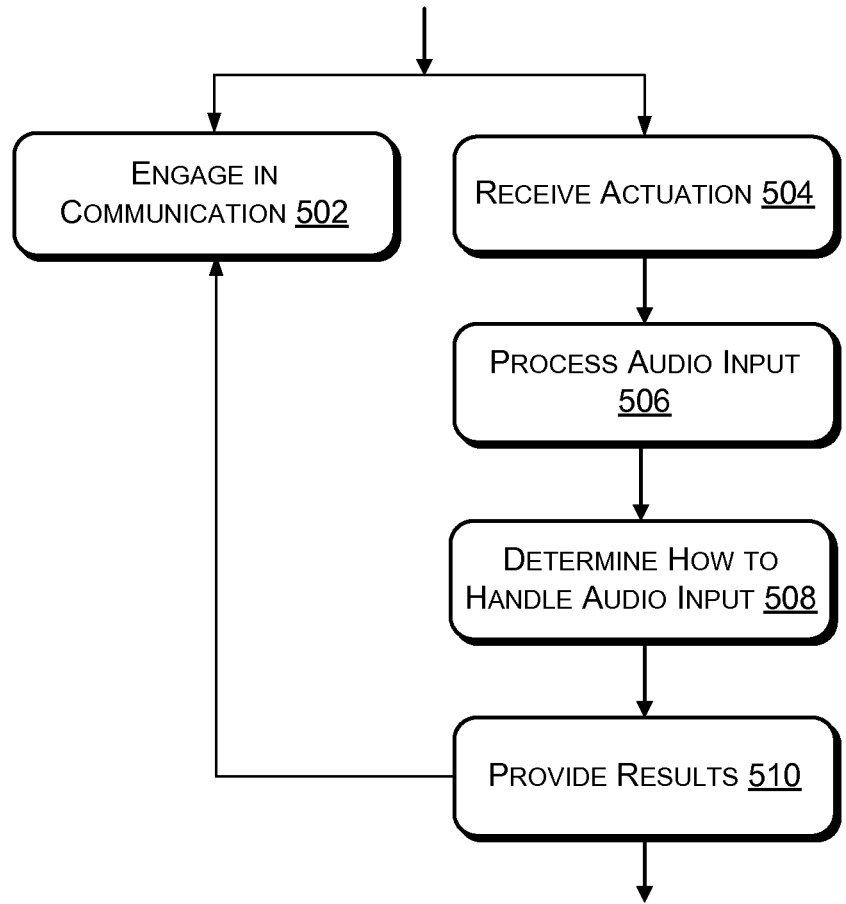
FIG. 5 illustrates a flowchart showing a method of receiving and handling audio input using a telecommunication device while the telecommunication device is engaged in communication with another device, in accordance with various embodiments.

FIG. 5 illustrates a flowchart showing a method of receiving and handling audio input using a telecommunication device while the telecommunication device is engaged in communication with another device. As shown, a user of a telecommunication device, such as telecommunication device 106, may be engaged in communication with another user of another device, block 502. In some implementations, the communication with the other device may be one of a phone call, a chat session, an instant messaging session, or an email message and engaging in the communication, block 502, may include writing the communication, speaking the communication, reading the communication, and/or listening to the communication.

While engaged in the communication, block 502, the telecommunication device may receive an actuation of a dedicated key, such as button or key 108, associated with a unified audio interface for audio commands and requests, block 504. The telecommunication device may then process audio input provided with the actuation, such as audio input 104, as an audio command or request, such as a command 116 or a request 114/118. After processing the audio input, the telecommunication device may evaluate the audio input to determine whether to handle the audio input as an audio command, as a request of a telecommunication device application, or as a network search request, block 508, the determining being based at least in part on a context or data associated with the communication with the other device. Next, the telecommunication device may provide results of the command or request to the telecommunication device and the other device, block 510.

FIG. 6 illustrates example user interfaces of a telecommunication device, each rendering a dedicated key, in accordance with various embodiments. As shown, the telecommunication device 106 is capable of rendering a plurality of UI displays, each including a dedicated GUI key 602. UI displays 604 and 606 are illustrative of the multiple different displays each including the GUI key 602.

In various implementations, the dedicated GUI key 602 may have the same functionality as the button or key 108 described above. The telecommunication device 106 may either interact with each application or process associated with UI displays 604 and 606 to have those applications render the GUI key, or may provide an overlay UI in which the GUI key 602 is the only visible portion of the overlay.

UI displays 604 and 606 can be any sort of UI displays rendered by any applications or processes of the telecommunication device 106. In FIG. 6, UI display 604 is apparently a smiley-face picture or wallpaper and UI display 606 is an icon for an email or messaging application.

Illustrative Operations Using Continuous Voice Commands

FIGS. 7-12 show processes that are illustrated as a collection of blocks in a logical flow graph, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure shall be interpreted accordingly.

The processes describe various illustrative functionality of the telecommunication device 106 based on continuous or substantially continuous voice commands received by the audio recognition module 110. For example, the telecommunication device 106 may operate as discussed above; however, the telecommunication device may be configured to operate to receive continuous or substantially continuous voice commands which simulate engagement or activation of the button 108 on a continuous basis until the button is disengaged or the voice activation is terminated by a voice command. The illustrative continuous voice commands may be applicable to a driving (operating) mode when the user 102 desires to operate his or her telecommunication device as a hands-free device. The user 102 may then use voice commands to control the telecommunication device 106 in accordance with the illustrative processes discussed below.

The processes are described with reference to the computing device 106 shown in FIG. 3 and the environment shown in FIG. 1. Of course, the processes may be performed in other similar and/or different environments.

Figure 7:
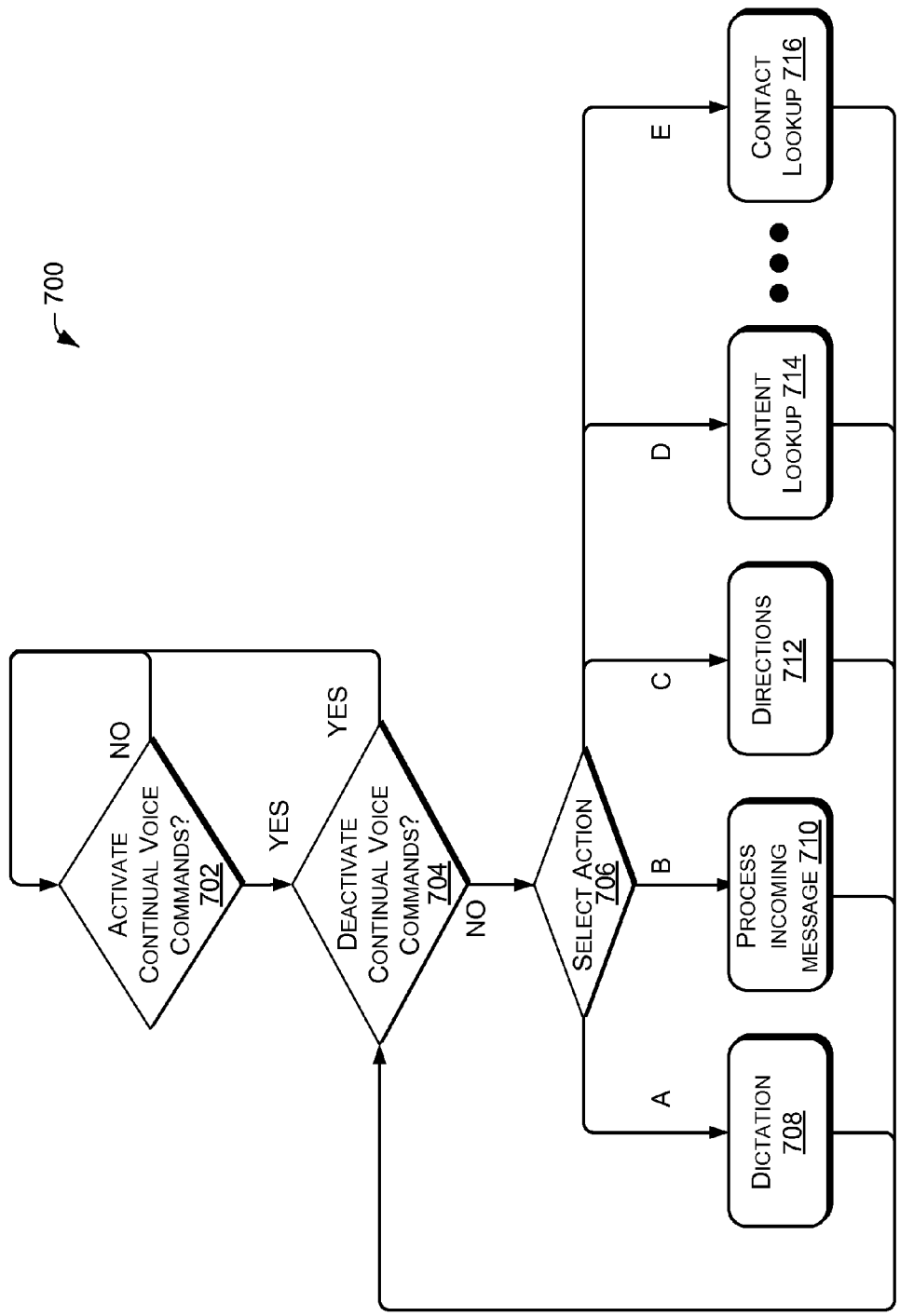
FIG. 7 is a flow diagram of an illustrative process to provide voice commands on a continuous basis to perform select mobile telecommunication tasks.

FIG. 7 is a flow diagram of an illustrative process 700 to provide voice commands on a continuous or substantially basis to perform select mobile telecommunication tasks.

At 702, the audio recognition module 110 may activate the voice commands on a continual basis. For example, the audio recognition module 110 may transition from a mode that requires activation of the button 108 prior to the receipt of a voice command to a mode that continually receives and processes voice commands until the mode is deactivated. In some embodiments, the continual voice command mode may be activated when the user 102 desires to use the telecommunication device 106 as a hands-free device that is controllable with voice commands while the user operates a vehicle or performs other tasks that may be simultaneously performed while operating the telecommunication device with voice commands. The voice commands may be continuous or substantially continuous such that the telecommunication device 106 remains active and listening rather than possibly entering a sleep state due to a lack of voice commands or user engagement with the telecommunication device.

In some embodiments, the telecommunication device 106 may determine that the user 102 is operating or moving in a vehicle, such as based on location information (e.g., global positioning system (GPS) data, etc.), speed, and/or other possible factors. Upon detection of movement in a vehicle, the telecommunication device 106 may automatically begin voice recognition using the audio recognition module 110. In some embodiments, the telecommunication device 106 may ask the user whether to initiate the continuous voice commands upon determination of moving in a vehicle, which may be replied to the user by a voice command and/or a touch command, possibly based on a preselected user preference. In this way, the user 102 may be able to control her telecommunication device after entering a vehicle and beginning travel in the vehicle without manually (via touch controls) turning on or activating the continual voice commands. The user may also decide not to operation using voice commands, such as when the user is a passenger and not a driver of the vehicle. In some embodiments, the telecommunication device 106 may sense a vehicle mode based on a position of the telecommunication device. For example, the telecommunication device 106 may sense a vehicle mode when the telecommunication device is attached to a dock that is associated with a vehicle (e.g., dock may provide a location identifier to trigger a vehicle mode that uses continuous voice commands), powered by a vehicle's power source which may include a detectable fingerprint, in communication with a wireless signal of the vehicle (e.g., radio frequency identifier (RFID), Bluetooth®, etc.) or by other detection operations. Therefore, the telecommunication device 106 may activate continual voice commands 702 in many situations, such as when the telecommunication device 106 determines a user is operating a vehicle based on location information, speed, and/or other data received by the telecommunication device.

When the voice commands are activated (following the "yes" route), then the process 700 may advance to an operation 704. When the voice commands are not activated (following "no" route), then the process 700 may loop back to the operation 702, possibly after a delay.

At 704, the audio recognition module 110 may deactivate the continual voice commands. For example, the user may provide a voice command to terminate use of the continual voice commands or the user may terminate the continual voice commands with a voice command (e.g., speaking "terminate voice commands", etc.). When the continual voice commands are terminated at 704 (following the "yes" route), then the process 700 may continue at the decision operation 702 as discussed above. However, when the continual voice commands are not terminated at 704 (following the "no" route), then the user 102 may provide continual voice commands to perform actions as introduced below and discussed in greater detail with reference to FIGS. 8-12.

At 706, the audio recognition module 110 may determine an action to perform. The action may be based on user voice commands or other types of actions. For example, the user 102 may issue a voice command (e.g., a command 116), which is used to select the action at the decision operation 706. The telecommunication device 106 may also select an action, such as by receiving an incoming call or message, which may then prompt the user to issue a voice command to perform further actions or processing.

As shown in FIG. 7, various actions may be performed following the action selection of the decision operation 706. Illustrative actions are listed below which follow from the decision operation 706 via routes A-E, although other actions are possible.

Following a route "A", at 708, the audio recognition module 110 may enable the user 102 to dictate text to compose a message, draft a document, or perform other dictation functions that convert (or associate) the user's spoken words into (or with) text, numbers, and/or symbols. The operation 708 is discussed in further detail with reference to FIG. 8.

Following a route "B", at 710, the audio recognition module 110 may enable the user 102 to process an incoming message. The operation 710 is discussed in further detail with reference to FIG. 9.

Following a route "C", at 712, the audio recognition module 110 may enable the user 102 to obtain directions for a destination location. For example, the directions may be driving directions provided as a list, on a map, via a navigation program (e.g., spoken to the user), and so forth. The operation 712 is discussed in further detail with reference to FIG. 10.

Following a route "D", at 714, the audio recognition module 110 may enable the user 102 to lookup content. For example, in response to a voice command from the user 102, the audio recognition module 110 may locate and play a music file, play a video, and/or display a picture. The operation 714 is discussed in further detail with reference to FIG. 11.

Following a route "E", at 716, the audio recognition module 110 may enable the user 102 to look up a contact. For example, in response to a voice command from the user 102, the audio recognition module 110 may locate a contact and then initiate a communication with the contact using a specified contact type (e.g., voice call, email, text message, etc.). The operation 716 is discussed in further detail with reference to FIG. 12.

The process 700 may continue after processing any one of the operations 708-716 by returning to the decision operation 704 and proceeding according to the description discussed above.

Figure 8:
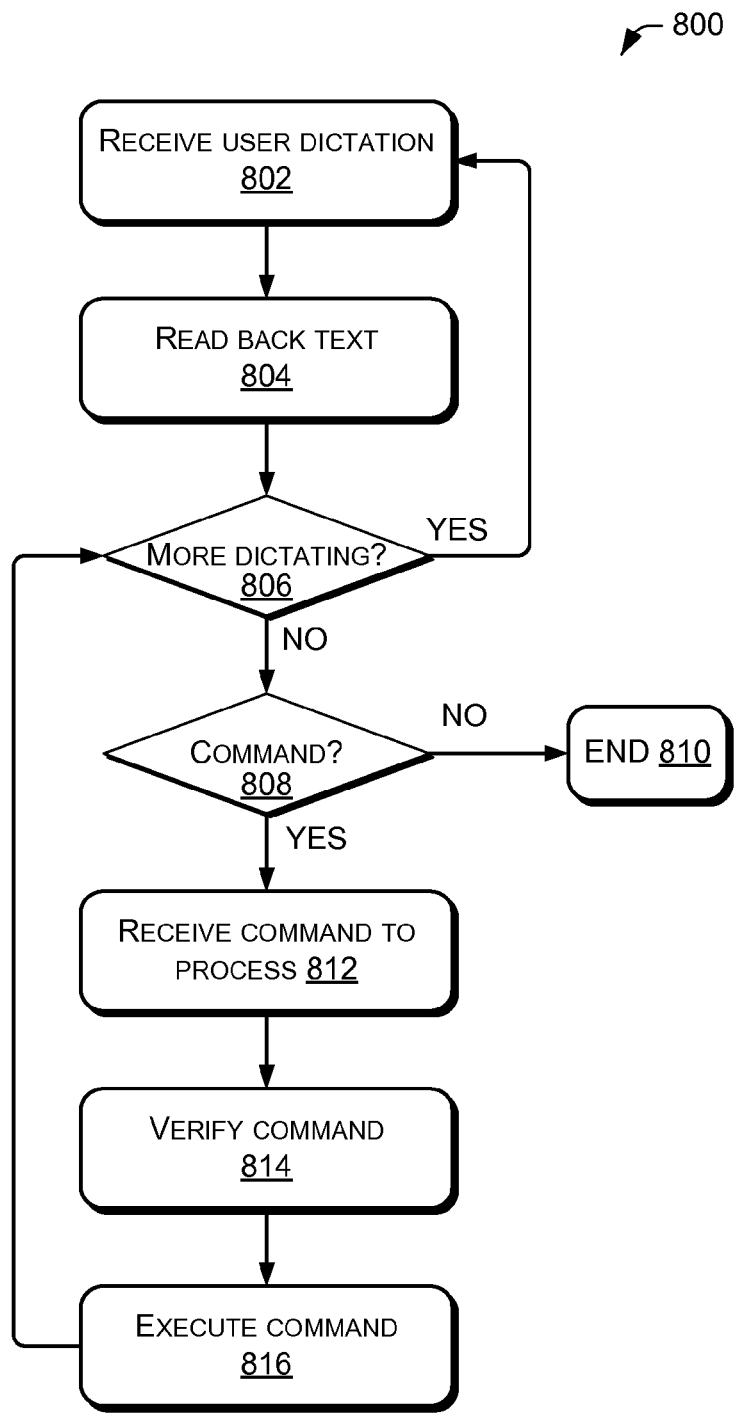
FIG. 8 is a flow diagram of an illustrative process to perform dictation using a telecommunication device controllable by voice commands.

FIG. 8 is a flow diagram of an illustrative process 800 to perform dictation using the telecommunication device 106 controllable by voice commands.

At 802, the audio recognition module 110 may receive a dictation from the user 102. For example, the user 102 may speak while the audio recognition module 110 identifies words and converts or associates the spoken words to written or typed words. The audio recognition module 110 may perform the dictation using the terms 128 and other data that may be stored locally on the telecommunication device 106 or accessed via the remote server 202 described with reference to FIG. 2.

At 804, the audio recognition module 110 may read back the written words (text) to the user 102. The written words may be read back to the user by analyzing each word after the dictation. The reading back of the words may verify whether the dictation at the operation 802 was performed correctly. The reading back may occur at fixed or variable intervals, at natural break points (end of sentence, pause in speaker, etc.), following a voice command (i.e., "read back", etc.), or at other times or in response to other triggers.

At 806, the audio recognition module 110 may determine whether more dictation is desired to occur. When more dictation is to occur, then the process 800 may continue at 802 by receiving user dictation via the "yes" route from the operation 806. However, when dictation is complete or paused for other operations, the process 800 may continue at 808 via the "no" route from the operation 806.

At 808, the audio routing module 112 may determine whether the user 102 has provided a command (e.g., the command 116). When the user does not provide a command, then the dictation may end at 810 (or return to the operations of the process 700) following the "no" route from the operation 808. When the user 102 has provided a command, which may be identified from the rules or priorities 126 and/or the terms or macros 128, then processing may continue at 812 following the "yes" route from the operation 808.

At 812, the audio recognition module 110 may receive the command to process. In some instances, the command may be spoken by the user 102 during the dictation or after dictation, which may require the audio routing module 112 to determine whether the word is in fact a command (rather than part of the dictation). For example, the user 102 may speak a command "save file," "read back," "send email," and so forth, which may be commands to perform operations related to the dictation received at the operation 802.

At 814, the audio routing module 112 may verify the command by a confirmation with the user. For example, the audio routing module 112 may prompt the user via spoken inquiry as to whether the received word is a command (e.g., "Are you sure you would like to save the file?") or whether the received word is part of the dictation. In some embodiments, the audio routing module 112 may perform the task without verifying the command, such as when performing the command may not have adverse effects on the dictation (e.g., saving the file, etc.).

At 816, the command may be executed by the telecommunication device 106. For example, the audio recognition module 110 may read back a portion of the dictation after a command "read back" or "read back last sentence," etc. A non-exhaustive list of commands may include saving the dictation, navigating within the dictation, reading a back a portion of the dictation, and sending the dictation to another location (e.g., as an email, etc., to a storage location, etc.). Following the execution of the command at the operation 816, the process may continue at the decision operation 806 to determine whether to continue dictation as discussed above.

Figure 9:
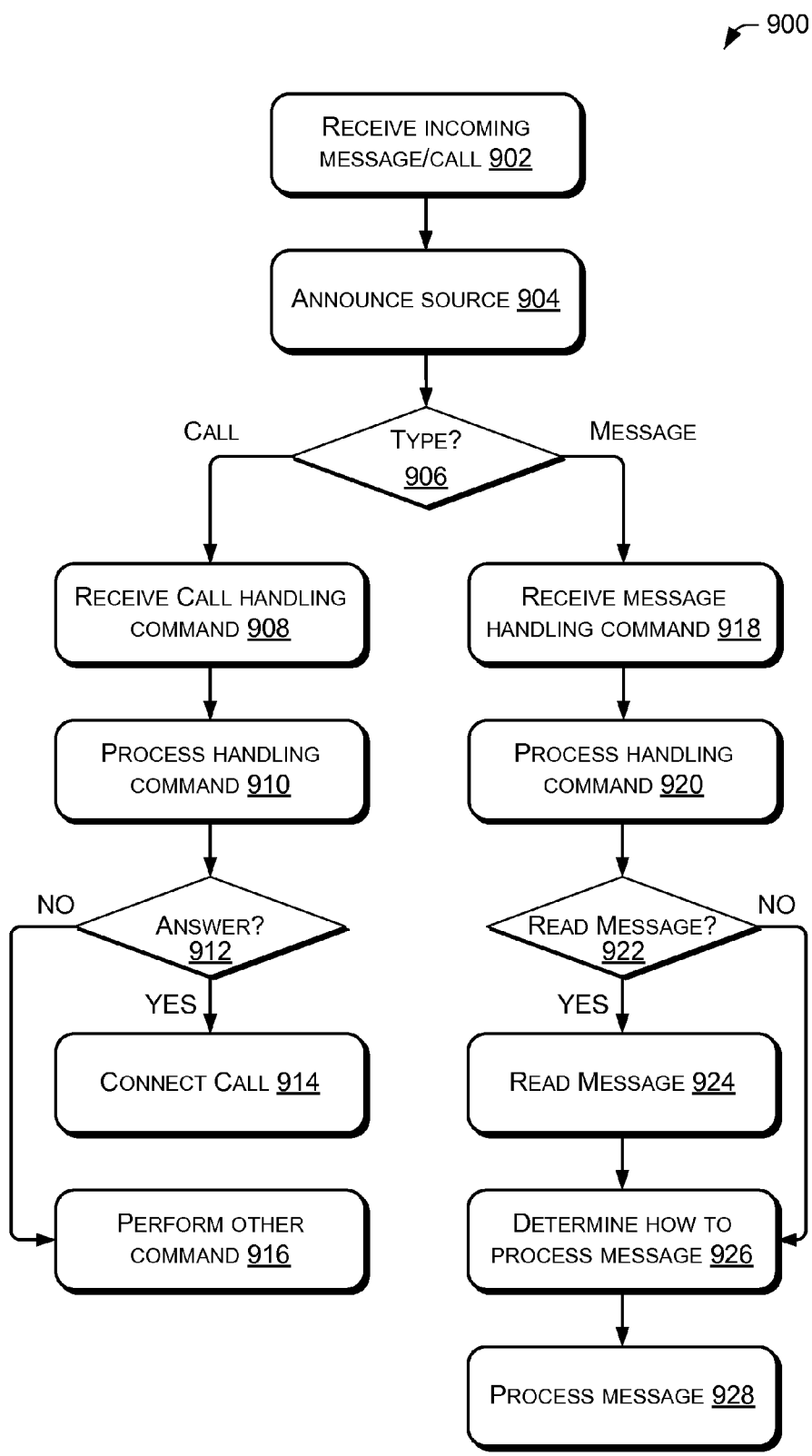
FIG. 9 is a flow diagram of an illustrative process to receive a message or call using a telecommunication device controllable by voice commands.

FIG. 9 is a flow diagram of an illustrative process 900 to receive a message or call using the telecommunication device 106 controllable by voice commands.

At 902, the telecommunication device 106 may receive an incoming message or call. For example, the telecommunication device 106 may receive a voice call via a mobile communication network or via an application such as a voice over internet protocol (VoIP) application. The telecommunication device 106 may also receive a message such as a text message, an email message, an instant messaging service message, or other types of messages that may or may not include other data (e.g., images, videos, and so forth).

At 904, the audio recognition module 110 may announce a source of the received message or call, and possibly other details as to the type of communication. For example, the audio recognition module 110 may state "call from Jerry," "email from Michele," or "text message from John," among other possible announcements.

At 906, the telecommunication device 106 may perform operations based on the type of incoming transmission (e.g., a call or a message). When the incoming transmission is a call (following the "call" route), which may include a voice call and/or a video call, then processing may continue at 908 as follows.

At 908, the audio recognition module 110 may receive a call handling command. For example, the call handling command may include "answer," "forward to voicemail," "ignore" or other possible commands.

At 910, the audio recognition module 110 may process the handling command. When the command is to answer the call as determined at 912 (via the "yes" route), then the call may be answered (i.e., connected) at 914.

At 916, other commands received at 908 and processed at 910 may be performed following the "no" route from the decision operation 912. For example, the incoming call may be forwarded to another location (e.g., to voicemail, another telephone number, etc.), ignored, or processed in other ways.

When the incoming transmission is a message at the decision operation 906 (following the "message" route), then processing may continue at 918. The message may include text messages, emails, instant messaging message, social network messages, or other types of messages that may or may not include additional content such as image, video clips, audio, or other data.

At 918, the audio recognition module 110 may receive a message handling command. For example, the message handling command may include "read message," "save message" or other possible commands.

At 920, the audio recognition module 110 may process the handling command. When the command is to read the message as determined at 922, then the message may be read to the user 102 at 924.

At 926, the audio recognition module 110 may determine how to process the message (possibly after reading the message or when the message is not read following the "no" route from the decision operation 922.

At 928, the audio routing module 112 may process the message according the determination from the operation 926.

Figure 10:
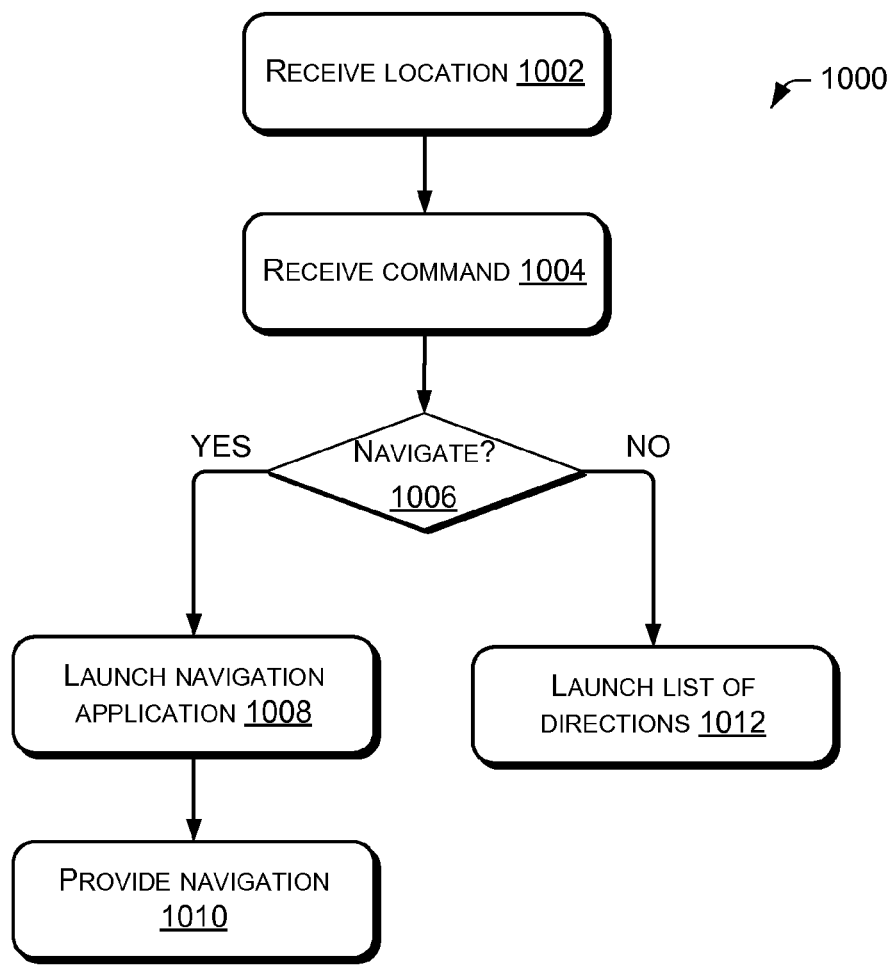
FIG. 10 is a flow diagram of an illustrative process to receive directions using a telecommunication device controllable by voice commands.

FIG. 10 is a flow diagram of an illustrative process 1000 to receive directions using a telecommunication device controllable by voice commands.

At 1002, the audio recognition module 110 may receive a destination location (or possibly another location) from the user 102 via a voice command. For example, the user 102 may speak "nearest airport," "123 main street," or other possible locations.

At 1004, the audio recognition module 110 may receive a command associated with the location. For example, the user 102 may state "navigate to nearest airport," "directions to nearest airport" or other commands. The command may be separate from the location or combined with the location (as shown in the examples above).

In some embodiments, the destination location (the operation 1002) and/or the command (the operation 1004) may be received from a communication to the user 102 via the telecommunication device 106. For example, the telecommunication device 106 may receive a message that includes the location. The telecommunication device 106 may then, when operating in the continuous voice command mode, use the location information as the location of the operation 1002 and/or use a command as the command at the operation 1004, and then continue processing at 1006. The telecommunication device 106 may also extract the location information and/or the command from other communication types, such as from voice calls (including from a voice of another person that may be communicating with the user via the telecommunication device), emails, instant message, text messages, or other communication types. The telecommunication device 106 may initiate the following operations (starting at 1206), possibly without further input or voice commands from the user 102 when the location and/or command are received from other communication types and not from the user 102 (e.g., via the audio recognition module 110).

At 1006, the audio recognition module 110 may determine whether to navigate to the location based at least in part on the command received at the operation 1004.

When the audio recognition module 110 determines to navigate (following the "yes" route from the decision operation 1006), then processing may continue at 1008. At 1008, the telecommunication device 106 may launch an application to provide navigation. The navigation program may be a mapping program that provides a visual representation of the user's location with respect to the destination (the location proved at the operation 1002), or may be a voice based mapping program that does not include visual information. The telecommunication device 106 may provide navigation at 1010 to assist the user 102 to reach the location.

When the audio recognition module 110 determines not to navigate (following the "no" route from the decision operation 1006), then processing may continue at 1012. At 1012, the telecommunication device may launch a list of directions to assist the user 102 to advance to (or possibly from) the location determined at the operation 1002.

Figure 11:
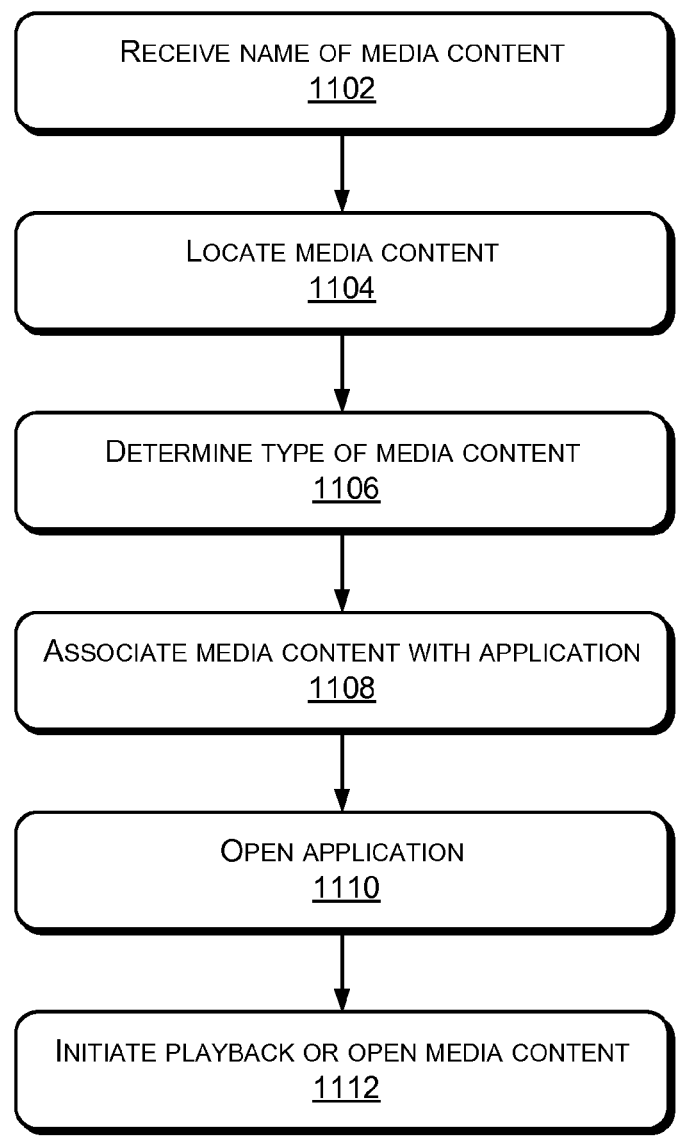
FIG. 11 is a flow diagram of an illustrative process to locate and play media using a telecommunication device controllable by voice commands.

FIG. 11 is a flow diagram of an illustrative process 1100 to locate and play media using a telecommunication device controllable by voice commands.

At 1102, the audio recognition module 110 may receive a name of media content that the user 102 desires to access. For example, the user 102 may speak a name of a song, an artist, a picture, a video, a playlist, or other media content.

At 1104, the telecommunication device 106 may locate the media content. For example, the telecommunication device 106 may search storage (e.g., the data 306, the memory 302, and/or the machine readable medium 324, the remote storage 204, etc.). In some embodiments, the telecommunication device 106 may search an index or specific folders or file locations to locate the media content. The telecommunication device 106 may also act as a "remote control" to access and initiate playback of content from other devices, which may be played back by the telecommunication device or another device (e.g., a home stereo, a remote server, etc.).

In some embodiments, the telecommunication device 106 may locate the media content based on attributes of the media content received at the operation 1102. For example, the user may request a picture that was taken last week. In some instances, multiple matches may be retrieved, which the user may have to select from using additional voice commands. The audio recognition module 110 may read selections or choices to the user 102 and then receive a selection from the user 102 of the choices.

At 1106, the telecommunication device 106 may determine the type of media content. For example, upon locating the media content, the telecommunication device 106 may identify a type based on a file extension or other attributes of the media content. The type may be a specific file type and/or a media type (e.g., video, audio file, picture, etc.).

At 1108, the telecommunication device 106 may associate the media content with an application that can play or show the media content. The application may be stored locally on the telecommunication device or remotely on another device. For instance, with a home stereo, the application may be an input mode to play the music through a wired or a wireless streaming connection.

At 1110, the telecommunication device 106 may open the application or cause the application to open on another device.

At 1112, the telecommunication device 106 may initiate playback or open the media content using the application. In some embodiments, the audio recognition module 110 may enable the user 102 to operate the application using voice commands. For example, when the media content is a song, the voice commands may include "pause," "forward," "reverse," "skip," "stop," "play," and so forth. As discussed above, the media content may be played on the telecommunication device or controlled by the telecommunication device while being played by another device.

Using the process 1100, the user 102 may access the media content by only providing voice commands that, when received by the audio recognition module 110 at the operation 1102, trigger the operations 1104-1112. Thus, the user may access the media content using the process 1100 while operating a vehicle using hands-free operation of the telecommunications device.

Figure 12:
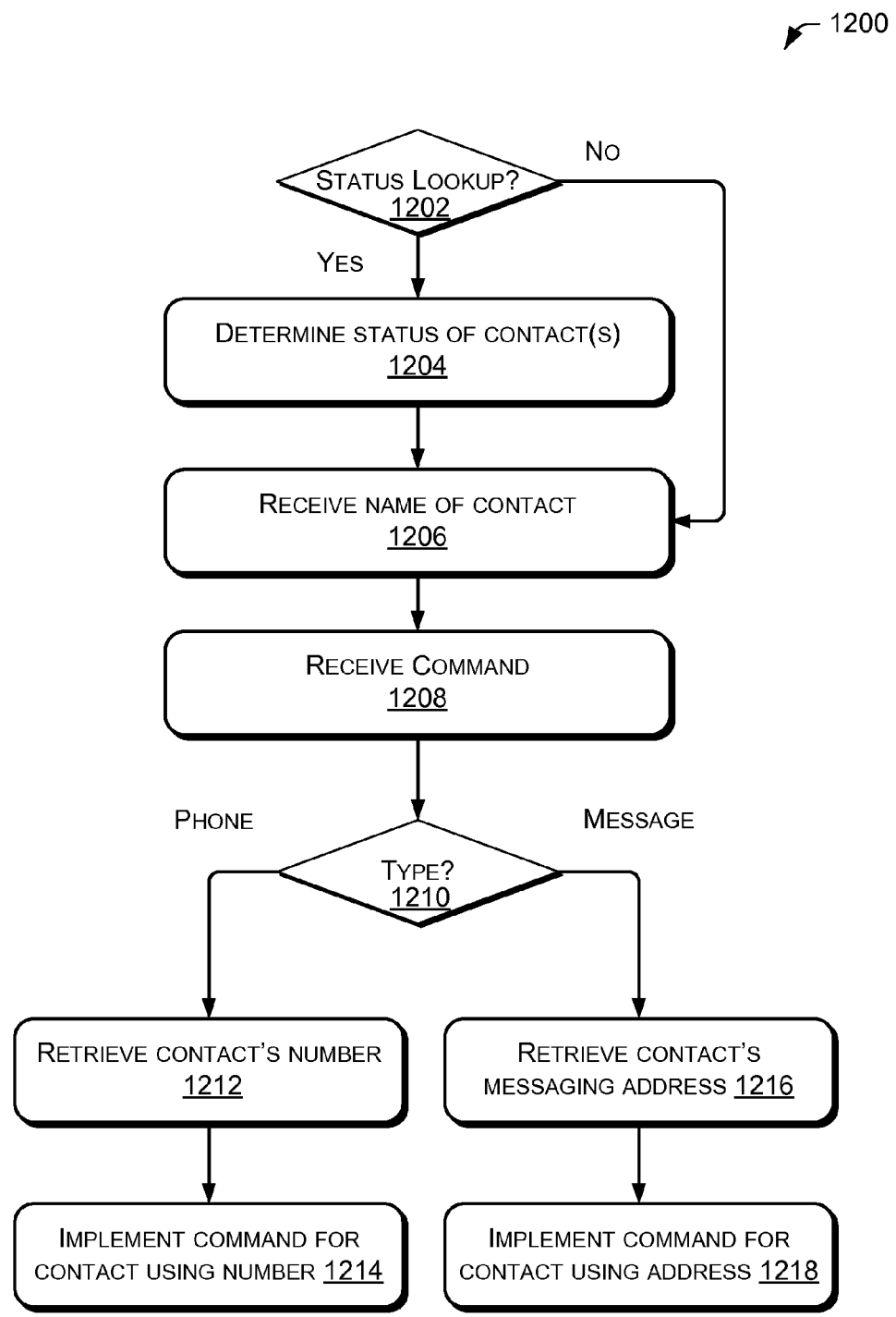
FIG. 12 is a flow diagram of an illustrative process to locate a contact using a telecommunication device controllable by voice commands.

FIG. 12 is a flow diagram of an illustrative process 1200 to locate a contact using a telecommunication device controllable by voice commands.

At 1202, the telecommunication device 106 may determine whether the user 102 desires to identify a status of one or more contact(s). For example, the user 102 may desire to know which contact(s) are available to communicate via an instant message, join a video call, or otherwise interact with the user.

When the telecommunication device 106 determines to lookup the status of one or more contact(s), then the telecommunication device may determine the status of the contact(s) at 1204. For example, the telecommunication device 106 may announce a list of contacts that are available for a particular type of contact (e.g., video call, instant message, online, etc.). In some embodiments, the audio recognition module 110 may allow the user to filter or narrow a list and/or inquire a status of a particular or specified contact. Following the operation 1204, or when no status lookup is performed (following the "no" route from the operation 1202), the process 1200 may continue at 1206.

At 1206, the audio recognition module 110 may receive a name of a contact from the user 102. The contact may be stored in an address book or other collection of contacts, or may be saved in a document that is stored on the telecommunication device or a remote server. For example, the contact information may be stored in an email, such as on a signature line at the end of the email.

At 1208, the audio recognition module 110 may receive a command associated with the contact from the user 102. For example, the user 102 may state "call John", "email Greg", or "text message Sally" among other possible commands.

At 1210, the audio recognition module 110 may determine the type of operation based on the command, which may be a call or a message request. When the type is a call (following the "call" route), then processing may continue at 1212.

At 1212, the telecommunication device 106 may retrieve the contact's number. For example, the telecommunication device 106 may retrieve the contact's mobile telephone number, another telephone number, or an address that corresponds to a calling application, such as a VoIP calling identifier or other calling identifier. In some instances, the user 102, via the audio recognition module 110, may be prompted to select from various available numbers/identifiers associated with a contact using a voice command (e.g., "call one" when three options are provided to the user).

At 1214, the telecommunication device 106 may implement the command for the contact using the number or identifier. Thus, the telecommunication device 106 may dial the contact or otherwise initiate a connection with the contact.

When the type is a message (following the "message" route from the operation 1210), then processing may continue at 1216. At 1216, the telecommunication device 106 may retrieve the contact's messaging address. For example, the telecommunication device 106 may retrieve the contacts email address, instant messaging name, a text messaging telephone number, or other messaging address. In some instances, via the audio recognition module 110, the user 102 may be prompted to select from various available messaging addresses associated with a contact using a voice command (e.g., "email two" when three options are provided to the user).

At 1218, the telecommunication device 106 may implement the command for the contact using the selected messaging address. Thus, the telecommunication device 106 may transmit a message to the contact. In some embodiments, the telecommunication device 106 may then initiate the dictation process 800 to enable the user to write a message to the contact using voice commands received and processed by the audio recognition module 110.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method implemented in a telecommunication device, the method comprising:
    receiving a text-based message;
    audibly announcing a name of a contact associated with the received text-based message;
    receiving, via an audio recognition module, a continuous string of audio input from a user through a unified audio interface of the telecommunication device;
    performing, via the audio recognition module, a text translation of the audio input received from the user of the telecommunication device;
    analyzing, via an audio routing module, at least a portion of the continuous string of audio input from the text translation to determine to handle the audio input as at least one of a process of the telecommunication device, a request of a telecommunication device application, or a network search request;
    determining, via the audio routing module, that the audio input is associated with a command to perform an action that is understood by the telecommunication device or the telecommunication device application;
    identifying, via the audio routing module, the action as a dictation action that is associated with the received text message;
    initiating, via the audio routing module, the dictation action while continuing to receive the continuous string of audio input from the user; and
    performing, via the audio routing module, the dictation action by generating text via a voice-to-text conversion of at least part of the continuous string of audio input received from the user.

2. The method of claim 1, further comprising:
    reading back, using a text-to-voice converter, at least a portion of the text to the user to allow the user to verify whether the generated text is correct.

3. The method of claim 2, further comprising:
    verifying with the user that the at least a portion of the continuous string of audio input is intended to be the command; and
    executing the command upon verification of the command.

4. The method of claim 2, wherein the reading back the at least a portion of the text is triggered by at least one of a pause in receipt of the continuous string of audio input from the user, a predetermined amount of words of the generated text or a predetermined duration of time.

5. The method of claim 1, further comprising:
    receiving another audio input as an additional command to handle the text-based message; and
    executing the additional command to process the text-based message.

6. The method of claim 5, wherein the additional command includes at least one of a command to cause audible output of the text-based message to the user or a command to save the text-based message.

7. The method of claim 1, further comprising:
    receiving a contact name of a person as at least a portion of the continuous string of audio input from the user;
    receiving a requested command associated with the contact name;
    locating the contact name using the telecommunication device;
    retrieving a phone number or a messaging address associated with the contact name based at least in part on the requested command; and
    establishing a communication with the person using the phone number or messaging address.

8. The method of claim 7, wherein the locating the contact name using the telecommunication device includes searching documents to locate a name of the person and retrieve the phone number or the messaging address associated with the name in one of the documents.

9. The method as recited in claim 1, wherein the text-based message is at least one of an electronic mail (email) message or an instant messaging message.

10. A telecommunication device comprising:
    a processor;
    a module operable by the processor and configured to receive an incoming transmission that is a text-based message and announce a contact associated with the incoming transmission;
    an audio recognition module operable by the processor and configured to recognize a continuous string of audio input captured on a substantially continuous basis by an audio capture process; and
    an audio routing module operable by the processor that receives the text translation of the audio input from the audio recognition module and is configured to evaluate the continuous string of audio input to:
    analyze at least a portion of the continuous string of audio input to determine to handle the audio input as at least one of a process of the telecommunication device, a request of a telecommunication device application, or a network search request a command;
    determine that the audio input is associated with a command to perform a dictation action that is understood by the telecommunication device or the telecommunication device application;
    determine to handle the continuous string of audio input as the dictation action to reply to the received text-based message;
    initiate the dictation action while the audio recognition module is configured to continuously receive the continuous string of audio input from a user; and
    perform the dictation action by generating text via a voice-to-text conversion of at least part of the continuous string of audio input received from the user.

11. The telecommunication device of claim 10, wherein the audio routing module further performs acts comprising:
    reading back, using a text-to-voice converter, at least a portion of the text to the user to allow the user to verify whether the generated text is correct;
    identifying at least a portion of the continuous string of audio input to contain a command to reply to the text-based message with the generated text;
    verifying with the user that the portion of the continuous string of audio input is intended to be the command; and
    executing the command upon verification of the command.

12. The telecommunication device of claim 10, wherein the text-based message includes an electronic mail (email) application message.

13. The telecommunication device of claim 10, wherein the text-based message includes an instant messaging application message.

14. The telecommunication device of claim 10, wherein the text-based message includes a text messaging application message.

15. A method comprising:
- receiving, by a telecommunication device, a text-based message;
- audibly announcing a contact associated with the received text-based message;
- receiving, via an audio recognition module, a continuous string of audio input from a user via a unified audio interface of the telecommunication device;
- performing, via the audio recognition module, a text translation of the audio input received from the user of the telecommunication device;
- analyzing, via an audio routing module, at least a portion of the continuous string of audio input from the text translation to determine to handle the audio input as at least one of a process of the telecommunication device, a request of a telecommunication device application, or a network search request;
- determining, via the audio routing module, that the audio input is associated with a command that is understood by the telecommunication device or the telecommunication device application, wherein the command is a dictation command to receive dictation from the user to provide dictated text in reply to the received text-based message;
- converting, via the audio routing module, at least another portion of the continuous string of audio input into the dictated text; and
- transmitting, by the telecommunication device, the dictated text as a reply text-based message to at least the contact associated with the received text-based message.

16. The method as recited in claim 15, further comprising causing audible output, after text-to-speech conversion, of content of the received text-based message.

17. The method as recited in claim 15, wherein the text-based message includes an electronic mail (email) message.

18. The method as recited in claim 15, wherein the text-based message includes an instant messaging message.

19. The method as recited in claim 15, wherein the text-based message includes a text messaging message.

20. The method as recited in claim 15, wherein the text-based message includes a social network message.

* * * * *